(12) United States Patent
Krebs

(10) Patent No.: US 11,621,988 B1
(45) Date of Patent: *Apr. 4, 2023

(54) ADAPTABLE INTERNET-OF-THINGS (IOT) COMPUTING SYSTEMS AND METHODS FOR IMPROVED DECLARATIVE CONTROL OF STREAMING DATA

(71) Applicant: DUNKWARE, LLC, Austin, TX (US)

(72) Inventor: Duncan L. Krebs, Highlands Ranch, CO (US)

(73) Assignee: DUNKWARE, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,099

(22) Filed: May 11, 2022

Related U.S. Application Data

(63) Continuation of application No. 17/472,008, filed on Sep. 10, 2021, now Pat. No. 11,457,052.

(51) Int. Cl.
| | |
|---|---|
| *H04L 65/61* | (2022.01) |
| *G06F 8/30* | (2018.01) |
| *G06F 9/451* | (2018.01) |
| *G06F 8/38* | (2018.01) |
| *G06F 9/448* | (2018.01) |

(52) U.S. Cl.
CPC .............. *H04L 65/61* (2022.05); *G06F 8/31* (2013.01); *G06F 8/315* (2013.01); *G06F 8/38* (2013.01); *G06F 9/4494* (2018.02); *G06F 9/451* (2018.02)

(58) Field of Classification Search
CPC ... H04L 65/4069; G06F 9/4494; G06F 9/451; G06F 8/31; G06F 8/315; G06F 8/38

USPC .......................................................... 707/602
See application file for complete search history.

(56) References Cited

U.S. PATENT DOCUMENTS

| | | | |
|---|---|---|---|
| 11,093,518 B1* | 8/2021 | Lu ....................... | G06F 11/3476 |
| 11,095,706 B1* | 8/2021 | Ankam ................. | H04L 67/025 |
| 2016/0078103 A1* | 3/2016 | Novik ................. | G06F 16/2477 |
| | | | 707/725 |
| 2018/0316727 A1* | 11/2018 | Tsironis ............. | H04L 63/0263 |
| 2021/0110328 A1* | 4/2021 | Hsiao ................ | G06F 16/24568 |
| 2021/0240720 A1* | 8/2021 | Muse ................ | G06F 16/24573 |
| 2021/0256632 A1* | 8/2021 | Chiocco ................ | G06V 20/17 |
| 2021/0258940 A1* | 8/2021 | Kim ....................... | H04L 5/0051 |
| 2022/0070636 A1* | 3/2022 | Sabella ................... | H04L 67/12 |

\* cited by examiner

*Primary Examiner* — Hosain T Alam
*Assistant Examiner* — Nicholas E Allen
(74) *Attorney, Agent, or Firm* — Marshall, Gerstein & Borun LLP

(57) ABSTRACT

Adaptable internet-of-things (IoT) computing systems and methods are disclosed for improved and flexible declarative control of streaming data, such as Big Data, in compute intense environments. A declarative scripting engine determines an input data stream based on a first declarative statement defining input data stream variable(s) of a declarative scripting language in declarative scripting module(s). The input data stream is bound to a stream controller and is ingested into computer memory. The declarative scripting engine generates a snapshot data stream based on a second declarative statement in the declarative scripting module(s), and is derived from the input data stream. A stream model is defined, where a listener entity comprising an event is triggered based on the input data stream or the snapshot data stream as ingested into the stream model.

30 Claims, 14 Drawing Sheets

| | | 406 | 212s | 212p | 212v | 212t | 214p | 214ma10 Sma10min | 214ma20 Sma20min | 214roc SmaRoc20x30sec | 216v7d VBar30sec |
|---|---|---|---|---|---|---|---|---|---|---|---|
| 402 | 404 | time | TickSymbol | TickLast | TickVolume | TickTradeCount | TickLast1sec | | | | |
| id | _row | | | | | | | | | | |
| 1499703 | TSLA | 12:00:36 | TSLA | 840.33 | 33797054 | 971709 | 840.33 | 837.94 | NULL | 0.03 | 21448 |
| 1500037 | TSLA | 12:00:37 | TSLA | 840.27 | 33798955 | 971738 | 840.27 | 837.94 | NULL | 0.04 | 21448 |
| 1500371 | TSLA | 12:00:38 | TSLA | 840.665 | 33809745 | 971867 | 840.665 | 837.94 | NULL | 0.04 | 21448 |
| 1500705 | TSLA | 12:00:39 | TSLA | 841 | 33815492 | 972034 | 841 | 837.95 | NULL | 0.04 | 21448 |
| 1501039 | TSLA | 12:00:40 | TSLA | 841.5 | 33821307 | 972143 | 841.5 | 837.95 | NULL | 0.05 | 21448 |
| 1501373 | TSLA | 12:00:41 | TSLA | 841 | 33824736 | 972260 | 841 | 837.95 | NULL | 0.05 | 21448 |
| 1501707 | TSLA | 12:00:42 | TSLA | 840.8006 | 33827516 | 972298 | 840.8006 | 837.95 | NULL | 0.06 | 21448 |
| 1517041 | TSLA | 12:00:43 | TSLA | 841.3981 | 33829508 | 972346 | 841.3981 | 837.96 | NULL | 0.06 | 21448 |
| 1517375 | TSLA | 12:00:44 | TSLA | 841.45 | 33830034 | 972370 | 841.45 | 837.96 | NULL | 0.06 | 21448 |
| 3943849 | CCL | 12:21:26 | CCL | 20.32 | 21288938 | 99246 | 20.3 | 20.21 | 20.21 | 0 | 6209 |
| 3944183 | CCL | 12:21:27 | CCL | 20.31 | 21353721 | 99493 | 20.32 | 20.21 | 20.21 | 0.05 | 6209 |
| 3944515 | CCL | 12:21:28 | CCL | 20.32 | 21361711 | 99569 | 20.31 | 20.21 | 20.21 | 0 | 6209 |
| 3944848 | CCL | 12:21:29 | CCL | 20.32 | 21368811 | 99574 | 20.32 | 20.21 | 20.21 | 0.05 | 6209 |
| 3945181 | CCL | 12:21:30 | CCL | 20.29 | 21379769 | 99657 | 20.32 | 20.21 | 20.21 | 0.05 | 6209 |
| 3945514 | CCL | 12:21:31 | CCL | 20.2955 | 21386380 | 99711 | 20.29 | 20.21 | 20.21 | 0.1 | 6209 |
| 3945847 | CCL | 12:21:32 | CCL | 20.31 | 21389783 | 99733 | 20.2955 | 20.21 | 20.21 | 0.1 | 6209 |
| 3946180 | CCL | 12:21:33 | CCL | 20.31 | 21392581 | 99762 | 20.31 | 20.21 | 20.21 | 0.1 | 6209 |
| 3962179 | CCL | 12:21:36 | CCL | 20.33 | 21510606 | 100284 | 20.3 | 20.21 | 20.21 | 0.15 | 6209 |
| 4375416 | BMY | 12:25:20 | BMY | 65.02 | 7235357 | 51804 | 65.02 | 64.94 | 64.85 | 0 | 7139 |
| 4375749 | BMY | 12:25:21 | BMY | 65.02 | 7241484 | 51963 | 65.02 | 64.94 | 64.85 | 0 | 7139 |
| 4376082 | BMY | 12:25:22 | BMY | 65.01 | 7246817 | 52007 | 65.01 | 64.94 | 64.85 | 0 | 7139 |
| 4391415 | BMY | 12:25:23 | BMY | 65 | 7253593 | 52048 | 65 | 64.94 | 64.85 | 0 | 7139 |
| 4391748 | BMY | 12:25:24 | BMY | 65.01 | 7256488 | 52065 | 65.01 | 64.95 | 64.85 | 0.02 | 7139 |
| 4392081 | BMY | 12:25:25 | BMY | 65 | 7261060 | 52084 | 65 | 64.95 | 64.85 | 0.02 | 7139 |
| 5406210 | AAPL | 12:34:12 | AAPL | 129.99 | 53012561 | 498531 | 129.99 | 129.79 | 129.75 | 0.02 | 79782 |
| 5406543 | AAPL | 12:34:13 | AAPL | 129.985 | 53019570 | 498627 | 129.985 | 129.79 | 129.75 | 0.01 | 79782 |
| 5406876 | AAPL | 12:34:14 | AAPL | 129.985 | 53021981 | 498655 | 129.985 | 129.79 | 129.75 | 0.01 | 224431 |
| 5407209 | AAPL | 12:34:15 | AAPL | 129.9887 | 53023388 | 498666 | 129.9887 | 129.79 | 129.75 | 0.01 | 224431 |
| 5407542 | AAPL | 12:34:16 | AAPL | 129.9998 | 53026827 | 498688 | 129.9998 | 129.79 | 129.75 | 0.02 | 224431 |
| 5407875 | AAPL | 12:34:17 | AAPL | 129.99 | 53027591 | 498695 | 129.99 | 129.79 | 129.75 | 0.02 | 224431 |

FIG. 4

Input Data Stream and Snapshot Data Stream Variables *(Illustrating Declarative Stream Processing Language)*

```
1   // Tick Stream Variables
2   var Symbol= input(202,0,STR,ID);                          — 212s
3   var Price = input(202,1,DUB);                             — 212p
4   var Volume = input(202,27,LONG);                          — 212v
5   var TradeCount = input(202,30,INT);                       — 212t
6   var AskPrice = input(202,31,DUB);
7   var AskSize = input(202,32,INT);
8
9   // Set the Price,Volume,TradeCount Every 1 Second
10  var Price1SecSnapshot = snapshot(Price[0]) 1 SEC;         — 214p
11  var Volume1SecSnapshot = snapshot(Volume[0]) 1 SEC;
12  var TradeCount1SecSnapshot = snapshot(TradeCount[0]) 1 SEC;
13
14  // Create Moving Averages From Price 1 Second Updates
15  var MovingAvg10min = avg({Price1SecSnapshot[0,599]});     — 214ma10
16  var MovingAvg20min= avg({Price1SecSnapshot[0,1199]});     — 214ma20
17  var MovingAvg30min= avg({Price1SecSnapshot[0,1799]});
18
19  // Create Moving Averages Deltas From Moving Averages
20  var MovingAvg10X20minRoc = roc({MovingAvg10min[0],MovingAvg20min[0]});
21  var MovingAvg20X30minRoc = roc({MovingAvg20min[0],MovingAvg30min[0]});  — 214roc
22
23  // Create Moving Volume and Trade Count Variables
24  var MovingVolume30Sec = Volume1SecSnapshot[0] - Volume1SecSnapshot[29];
25  var MovingTradeCount30Sec = TradeCount1SecSnapshot[0] - TradeCount1SecSnapshot[29];
26
27  // Create Volume & Trade CountBars
28  var VolumeBar30Sec = snapshot(Volume1SecSnapshot[0] - Volume1SecSnapshot[29]) 30 SEC;
29  var TradeCountBar30Sec = snapshotTradeCount1SecSnapshot[0] - TradeCount1SecSnapshot[14] ) 15 SEC;
```

FIG. 6A

Aggregated Data Stream Variables *(Stream Process Variable Aggregations)*

```
1  // 7 Day High Aggregation For Variable MovingVolume30Sec
2  var MovingVolume30SecHigh7Day = agg(MovingVolume30Sec,HIGH, 7 DAYS);     — 216v7d
3  // 14 Day Average For Variable 10 Minute Moving Average
4  var MovingAverage10Min14DayAverage = agg(MovingAvg10min,AVG, 14 DAYS);   — 216
5  // Highest 30 second volume bar in last 30 days
6  var VolumeBar30secHigh30Day = agg(VolumeBar30Sec, HIGH,30 DAYS);
7
```

Entity Event & Entity Classes

```
1   EntityEvent Volume30DayBreakout;
2
3  ⊙EntityClass VolumeBreakout {
4
5    @VarListener(VolumeBar30Sec)
6  ⊙ function check() {
7      // Trigger event if the last 30 second volume bar value is
8      // 3000% or more greater than the 30 day high value of that variable.
9  ⊙   if(percentChange(VolumeBar30Sec[0],VolumeBar30secHigh30Day [0]) > 3000) {
10        eventTrigger(VolumeBar30DayBreakout);
11     }
12   }
13 }
14
```

*Applying Stream Processing Language To Weather*

```
1   // Weather Stream Inputs
2   var Humidity= input(100,0,DUB);
3   var Visibility = input(100,1,INT);
4   var Pressure = input(202,27,DUB);
5   var Wind = input(202,30,DUB);
6   var Temperature = input(202,31,DUB);
7
8   // 30 Day High Wind
9   var WindHigh30Day = agg(Wind,HIGH,30,DAYS);
10
11  // Wind High30 Day Event Declaration
12  EntityEvent WindHigh30 Day;
13
14  // Wind High30 Day Event Class
15
16  EntityClass WindHigh30Day {
17
18    @VarListener(Wind)
19    function check() {
20      if(Wind[0] > WindHigh30Day[0]) {
21        eventTrigger(WindHigh30Day);
22      }
23    }
24  }
```

— 212
— 216
— 230

FIG. 6E

ADAPTABLE INTERNET-OF-THINGS (IoT) COMPUTING SYSTEMS AND METHODS FOR IMPROVED DECLARATIVE CONTROL OF STREAMING DATA

CROSS REFERENCE TO RELATED APPLICATIONS

This application claims the benefit of U.S. application Ser. No. 17/472,008 (filed on Sep. 10, 2021). The entirety of the foregoing application is incorporated by reference herein.

FIELD

The present disclosure generally relates to adaptable internet-of-things (IoT) computing systems and methods, and more particularly to, adaptable IoT computing systems and methods for improved declarative control of streaming data.

BACKGROUND

Available data and related data sources are growing at an exponential rate, where gigabytes and terabytes of data (Big Data) may be generated and streamed, sometimes on a minute or hourly basis, to and from computing devices, such as internet-of-things (IoT) devices in communication with one another across computer network(s). Accordingly, a problem arises in developing computing platforms that can efficiently and effectively handle such large quantities of data, especially when the data sources are different and the computing platform is to be configured for a specific end-use, e.g., controlling further devices, etc.

Conventional computing platforms, such as computing servers, server farms, and platforms can receive this data, but such conventional computing platforms are typically difficult to configure from both a computing resource and efficiency perspective, especially a platform is newly established. For example, configuration of a platform typically involves sourcing and setting up a server environment (e.g., a cloud server environment), where the server environment must be coded or programmed, manually, to receive data from a plethora of different data sources having various data formats. In addition, client applications of the server environment are typically not interrelated causing redundant data sources to be received at a server environment, requiring increased overhead in processing and memory resources.

Still further such conventional server environments can be difficult to develop, debug, or otherwise detect errors, where the data is received in real-time and/or near real time. Ongoing development of the server environment, including the elimination of errors and bugs of the environment, requires manual code and programming by skilled programmers. This is especially so for newly established server environments to require routine maintenance and manual code update in order to update and fix the computing environment to perform specific tasks based on various type or formats data.

For the forgoing reasons, there is a need for adaptable IoT computing systems and methods for improved declarative control of streaming data, as further described herein.

SUMMARY

Generally, as described herein, adaptable IoT computing systems and methods are disclosed for improved declarative control of streaming data, e.g., including by way of non-limiting example, by providing adaptable and/or compute cluster controlled ingestion of data streams through use of a declarative scripting modules coded in a proprietary declarative scripting language. Such adaptable IoT computing systems and methods provide a flexible and dynamic platform as a solution to solve IoT and Big Data problems that arise from ingesting gigabits and/or terabits of data or data streams into a single platform. Such vast amounts data, as ingested for IoT and/or Big Data platforms, needs to be managed, formatted, controlled, or otherwise configured in the first instance in order to be used, for example, to train artificial intelligence models (e.g., such as machine learning models), to control devices (e.g., IoT devices), or otherwise make determinations based on data that is configured to interoperate together even though such data may be ingested in different formats and/or from different sources in large size data streams, in the second instance.

The solutions herein provide a declarative and adaptable IoT computing platform for dynamically controlling such IoT data, Big Data, or otherwise data streams in real-time and/or near-real-time, where, by non-limiting example, a clustered computer environment may be controlled, scaled, or otherwise configured with one or more simple, intuitive, and efficient declarative scripting modules. The declarative scripting modules include a declarative scripting language that is extensible and efficient in that it allows an operator or user (e.g., by using direct programmed control using the declarative scripting language or through GUI-based control, using one or more stream view GUIs) to build or derive various data streams from existing data streams being ingested into the compute environment. This not only provides for configuration efficiency (through the use of a mature and debugged platform), but also provides computational efficiency (in reduced memory and processor usages) as the adaptable IoT computing platform, as described herein, is configured to ingest less data into a computing environment, or at a server, compared to conventional platforms where such data may be received redundantly or in duplication.

Still further, the declarative scripting language, and related declarative scripting modules are reusable across different data streams and for different types and/or formats of data such that the adaptable IoT computing systems and methods herein may be flexibly and efficiently configured by altering only a few lines of code, allowing the adaptable IoT computing platform or otherwise environment, as described herein, to be reused in different contexts, including live streaming, data mining, and for different end purposes, e.g., artificial intelligence modeling, weather predictions, market or trading predictions, and/or the like.

More specifically, as described in various aspects herein, an adaptable internet-of-things (IoT) computing system is disclosed. The adaptable IoT system is configured for improved declarative control of streaming data. The adaptable IoT computing system may comprise a stream controller communicatively connected to a computer network. The adaptable IoT computing system may further comprise a declarative scripting engine comprising one or more declarative scripting modules comprising a declarative language modifiable to programmatically configure one or more data streams ingested by the stream controller. The adaptable IoT computing system may further comprise a computer-executable instructions stored in one or more memories, that, when executed by one or more processors, cause the one or more processors to determine, by the declarative scripting engine, an input data stream based on a first declarative statement defining one or more input data stream variables of the declarative scripting language in the one or more declarative scripting modules. The computer-executable instructions, when executed by one or more processors, may further cause the one or more processors to bind the input data stream to the stream controller, wherein the input data stream data is ingested into the one or more memories. The computer-executable instructions, when executed by one or more processors, may further cause the one or more processors to generate, by the declarative scripting engine, a snapshot data stream based on a second declarative statement defining one or more snapshot stream variables of the declarative scripting language in the one or more declarative scripting modules. The snapshot data stream is derived from the input data stream and ingested into the one or more memories. The computer-executable instructions, when executed by one or more processors, may further cause the one or more processors to define a stream model based on the input data stream and snapshot stream data. The computer-executable instructions, when executed by one or more processors, may further cause the one or more processors to determine a listener entity comprising an event based on a listener declarative statement of the declarative scripting language. The computer-executable instructions, when executed by one or more processors, may further cause the one or more processors to trigger the event based on the input data stream or the snapshot data stream as ingested into the stream model.

In an additional aspect, an adaptable internet-of-things (IoT) computing method is disclosed for improved declarative control of streaming data. The adaptable IoT computing method comprises determining, by a declarative scripting engine, an input data stream based on a first declarative statement defining one or more input data stream variables of a declarative scripting language in one or more declarative scripting modules. The adaptable IoT computing method may further comprise binding the input data stream to the stream controller, wherein the input data stream data is ingested into one or more memories. The adaptable IoT computing method may further comprise generating, by the declarative scripting engine, a snapshot data stream based on a second declarative statement defining one or more snapshot stream variables of the declarative scripting language in the one or more declarative scripting modules. The snapshot data stream is derived from the input data stream and ingested into the one or more memories. The adaptable IoT computing method may further comprise defining a stream model based on the input data stream and snapshot stream data and determining a listener entity comprising an event based on a listener declarative statement of the declarative scripting language. The adaptable IoT computing method may further comprise triggering the event based on the input data stream or the snapshot data stream as ingested into the stream model.

In a still further aspect, a tangible, non-transitory computer-readable medium storing instructions for improved declarative control of streaming data is disclosed. The instructions, when executed by one or more processors, cause the one or more processors to determine, by a declarative scripting engine, an input data stream based on a first declarative statement defining one or more input data stream variables of a declarative scripting language in one or more declarative scripting modules. The instructions, when executed by one or more processors, may further cause the one or more processors to bind the input data stream to the stream controller, wherein the input data stream data is ingested into one or more memories. The instructions, when executed by one or more processors, may further cause the one or more processors to generate, by the declarative scripting engine, a snapshot data stream based on a second declarative statement defining one or more snapshot stream variables of the declarative scripting language in the one or more declarative scripting modules. The snapshot data stream is derived from the input data stream and ingested into the one or more memories. The instructions, when executed by one or more processors, may further cause the one or more processors to define a stream model based on the input data stream and snapshot stream data and determine a listener entity comprising an event based on a listener declarative statement of the declarative scripting language. The instructions, when executed by one or more processors, may further cause the one or more processors to trigger the event based on the input data stream or the snapshot data stream as ingested into the stream model.

The present disclosure relates to improvements to technologies or technical fields at least because the present disclosure describes or introduces improvements to computing devices in the fields of Internet-of-Thing and/or Big Data computing devices and/or environments, whereby the adaptable internet-of-things (IoT) computing systems and methods execute on server(s), including on server farms and/or clustered computer environments, and improves these computing systems by introducing declarative scripting modules and a related declarative scripting language that allow for efficient configuration, scaling, and reuse and reduction of computer resources, including processing, memory, and data streams, and related data, as efficiently ingested into and stored the memory and as processed by related processors (e.g., processors of a given server, server farm, or compute cluster). For example, groups of entity classes, such as a listener entity, may listen to or otherwise track or monitor, a single source data stream for determination of when to trigger an event based on one or more data stream. The single source data stream may be reused for various entity classes (e.g., listeners) thereby reducing the amount of data ingested into the platform, processed by the related processors, and/or stored in related memory. This improves the system by creating a flexible and dynamic approach to configuring multiple data streams and potential listeners, with the use of a data stream used or reused across one or more entity classes, listeners, events which may be defined in a declarative scripting module.

In addition, the adaptable IoT computing systems and methods disclosed herein describes improvements to the field of clustering and scaling in computing clusters with one or more computing node devices (e.g., servers in a server farm). For example, the adaptable IoT computing systems and methods may comprise scaling storage of ingested data and/or computed data (e.g., any one or more of input data streams, snapshot data streams, and/or aggregated data streams) into one or more memories, such as databases in a distributed compute environment. Scaling the storage may comprise distributing and storing the data across the computing nodes (e.g., servers) based on compute requirements as determined by a stream controller. The data, when scaled, can be reduced (e.g., once received or computed) to reduce memory storage requirements through the scaled cluster, which may comprise one or more computing devices (e.g., servers of a server farm). The data ingested and/or computed may also be configured, via the declarative scripting modules, to ingest or process the data streams in parallel across multiple computer servers, cluster nodes, and/or processor in order to allow increased throughput of the ingested data and/or computation thereof.

In a similar fashion, a stream controller or RESTful API may be used to reduce or otherwise make more efficient memory usage and/or processing usage of the underlying computer device or computing environment (e.g., a clustered compute environment), with which the stream controller and/or RESTful API interact. For example, the stream controller and/or RESTful API may spin down or reduce processor and/or memory for nodes that become unused, either through dynamic deallocation or through selection or request by a user (e.g., via programmatic modification or update of a declarative scripting module or via a stream view GUI as describe herein). In such aspects, the node(s), whether actual or virtual servers, may be reallocated, pooled, adjusted, or otherwise configured to reduce the number of data streams, and therefore number of respective stream model(s) executing or implemented by an underlying computing device or environment, thereby freeing, or making more efficient, processing and/or memory utilization of the underlying computing device or environment. Thus, such systems and methods are configured to operate using a reduced processing and/or memory, and thus can operate on more limited computer and memory devices. Such reduction frees up the computational resources of an underlying computing system, thereby making it more efficient.

Still further, the adaptable IoT computing platform, as described herein, improves data fidelity, by in some aspects, translating the ingested data stream (e.g., IoT and/or Big Data) into common information model format for storage and processing. For example, an input data stream may be converted into a common information model format for ingestion by the stream controller. In this way, input data streams may be translated from conventional open protocol standards (e.g., JSON, XML, etc.) into a proprietary common information model for universal data processing across the system. The common information model format formats the data to be consistent and streamlined for ingestion, computation, or otherwise input into or use by a stream model. The proprietary common information model also allows the data to be stored in a compact and reduced manner, thereby reducing overall memory requirements.

Still further, triggering of events based on ingested or computed data, such as input data stream or the snapshot data stream respectively, and, e.g., in real-time or near real-time, may cause data output on outbound output connectors. Such output connectors may comprise output to systems configured for device control, machine learning training, data mining, automated trading, etc. as the data captured and analyzed by the adaptable IoT computing platform provides machine learning, artificial intelligence systems, Big Data environments, a large and unique dataset, involving not only ingested data but also derived data, from which to learn or otherwise use with compared to conventional datasets.

In addition, the present disclosure includes specific features other than what is well-understood, routine, conventional activity in the field, and that add unconventional steps that confine the claim to a particular useful application, e.g., adaptable IoT computing systems and methods for improved declarative control of streaming data through the use of declarative scripting modules using a declarative scripting language.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 4 illustrates an example data session of the stream model of FIG. 2, in accordance with various aspects disclosed herein.

FIG. 6A illustrates an example declarative scripting module implementing a declarative scripting language, in accordance with various aspects disclosed herein.

FIG. 6B illustrates a further example declarative scripting module implementing a declarative scripting language, in accordance with various aspects disclosed herein.

FIG. 6C illustrates a further example declarative scripting module implementing a declarative scripting language, in accordance with various aspects disclosed herein.

FIG. 6E illustrates a further example declarative scripting module implementing a declarative scripting language, in accordance with various aspects disclosed herein.

configured to receive an output generated based on triggering of an event of a stream model, in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
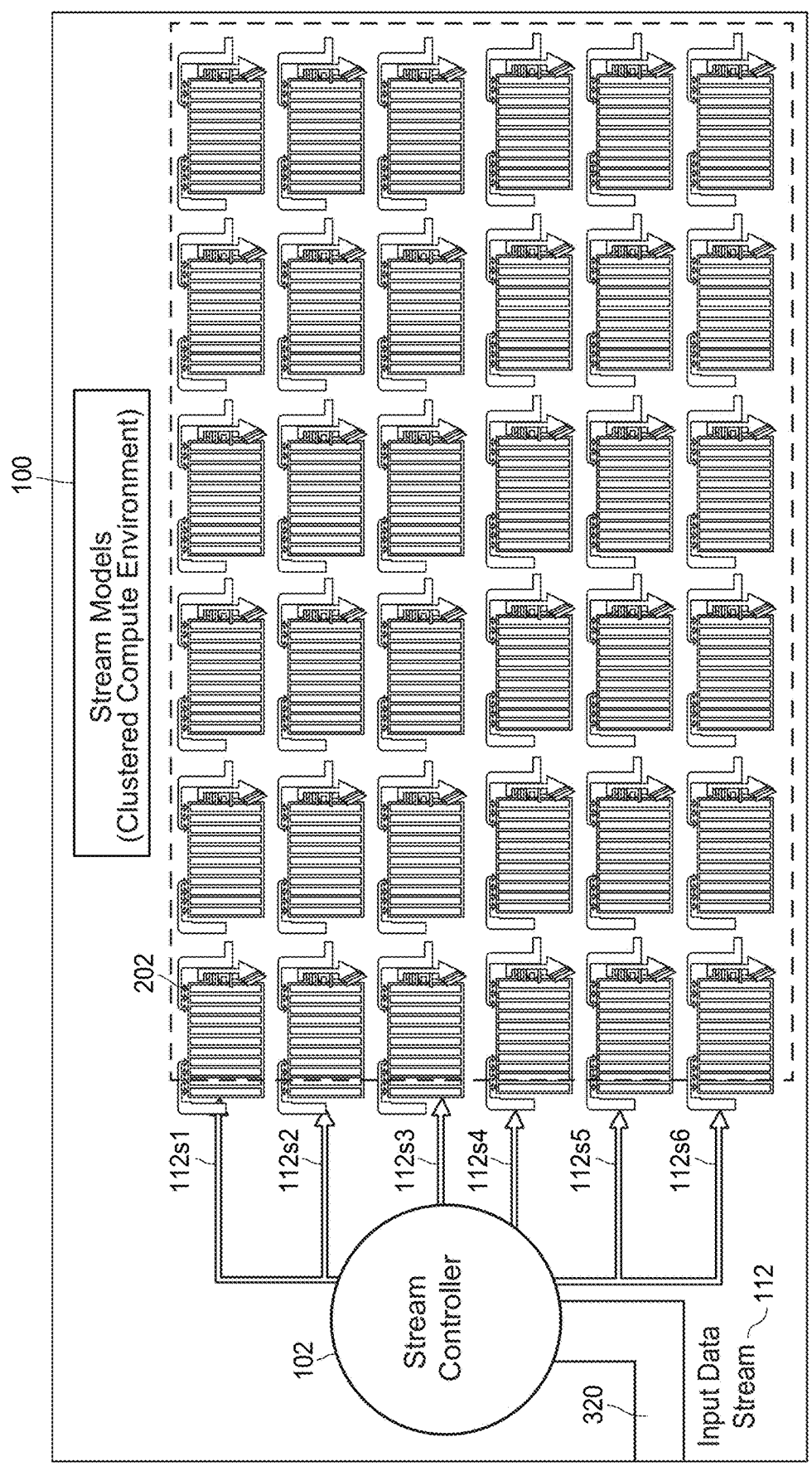
FIG. 1 illustrates an example stream controller communicatively connected to a computer network, in accordance with various aspects disclosed herein.

FIG. 1 illustrates an example stream controller 102 communicatively connected to a computer network 320, in accordance with various aspects disclosed herein. In various aspects, stream controller 102 may comprise a compute controller configured to distribute data streams or data across a plurality of servers (e.g., server farm) or otherwise within a distributed network, such as clustered compute environment 100. For example, in some aspects, stream controller 102 may comprise an elastic controller or an adaptable controller such as a load balancer controller. In such aspects, the load balancer controller may comprise an AMAZON WEB SERVICES (AWS) LOAD BALANCER CONTROLLER on an AMAZON ELASTIC COMPUTE CLOUD (AMAZON EC2) node group, e.g., as operating on the AMAZON ELASTIC KUBERNETES SERVICE (AMAZON EKS). In such aspects, the stream controller 102 may be deployed on the AMAZON EC2 node group in AMAZON EKS. Additionally, or alternatively, stream controller 102 may comprise one or more processors (e.g., as provided by INTEL, AMD, or the like), or otherwise controller(s), for analyzing, directing, adjusting, adapting, or otherwise configuring data stream(s) or otherwise data ingested by the stream controller 102, in accordance with the disclosure herein. Additionally or alternatively, the stream controller 102 may comprise software for directing, adjusting, adapting, or otherwise configuring data stream(s) or otherwise data ingested by the stream controller 102.

As illustrated for FIG. 1, input data stream 112 may be ingested by stream controller 102 from computer network 320. The data may be analyzed, directed, adjusted, adapted, or otherwise configured by stream controller 102 to form, generate, or otherwise establish one or more data streams 112$s$1-112$s$6. The one or more data streams 112$s$1-112$s$6 may be distributed or otherwise provided to clustered compute environment 100, which may be determined, at least in part, by stream controller 102. For example, stream controller 102 may determine which computing nodes are matched to which of the data streams 112$s$-112$s$6, which may be based on the number of data streams and/or resource utilization (e.g., processor and/or memory usage) of the computing the computing nodes. In various aspects, each node of the clustered compute environment 100 may comprise a computing device, such as a server, and/or a virtual computing device, such as a virtual server. As illustrated for FIG. 1, each node may comprise or implement a stream model (e.g., stream model 202), as further described for FIG. 2 herein. Generally, each of the stream models (e.g., stream model 202) represents sessions of data streams or data as ingested or captured over time and/or for a given time interval, e.g., by stream controller 102. It is to be understood that one or more stream model(s) may ingest data, where the number of stream model(s) may be scaled, updated, allocated, reallocated, or otherwise configured to ingest data from stream controller 102. This may comprise having one or more stream model(s) configured within clustered compute environment 100.

In some aspects, scaling of the number of nodes and/or stream models may be set as fixed, where, for example, an expected number of stream model(s) are configured to ingest data and/or data streams (e.g., data streams 112$s$1-112$s$6). Additionally, or alternatively, scaling may be dynamic based on input data size, volume, or otherwise amount, which comprise the number of messages (e.g., data messages) or raw data size received per second (or some other time interval) on one or more of the data streams (e.g., data streams 112$s$1-112$s$6). Additionally, or alternatively, the scaling may be dynamic based on a number or a count of declarative statements, e.g., as determined by a declarative scripting engine, in one or more declarative scripting modules, such as those described herein for FIGS. 6A-6D.

Scaling, or otherwise updating or controlling data streams (e.g., data streams 112$s$1-112$s$6), may be implemented by a representational state transfer (RESTful) application programming interface (API) configured to receive requests to add, update, and/or delete data streams (e.g., data streams 112$s$1-112$s$6). The RESTful API may be implemented as software as part of the stream controller 102. The RESTful API may be implemented as software separate from the stream controller 102, but may be communicatively coupled to stream controller 102. The RESTful API may also receive requests to add, update, and/or delete stream model(s) that ingest the data or data streams (e.g., data streams 112$s$1-112$s$6). For example, such requests may be received via the stream view GUIs as depicted for FIGS. 7A and 7B herein. The stream controller 102 and/or RESTful API may be used to reduce or otherwise make more efficient memory usage and/or processing usage of the underlying computer device or computing environment (e.g., clustered compute environment 100), with which the stream controller 102 and/or RESTful API interact. For example, the stream controller 102 and/or RESTful API may spin down or reduce processor and/or memory for nodes that become unused, either through dynamic deallocation or through selection or request by a user (e.g., via a stream view GUI as describe herein). In such aspects, the node(s), whether actual or virtual servers, may be reallocated, pooled, adjusted, or otherwise configured to reduce the number of data streams (e.g., reduction of data streams 112$s$1-112$s$6), and therefore allocate, reallocate, or otherwise update the number of respective stream model(s) executing or implemented by an underlying computing device or environment, thereby freeing or making more efficient processing and/or memory of the underlying computing device or environment. In this way, various combinations, permutations, or otherwise numbers of data streams (e.g., data streams 112$s$1-112$s$6) may be setup, scaled, or otherwise configured with various numbers of stream model(s) to allow for a robust, elastic, or otherwise adjustable system.

Figure 2:
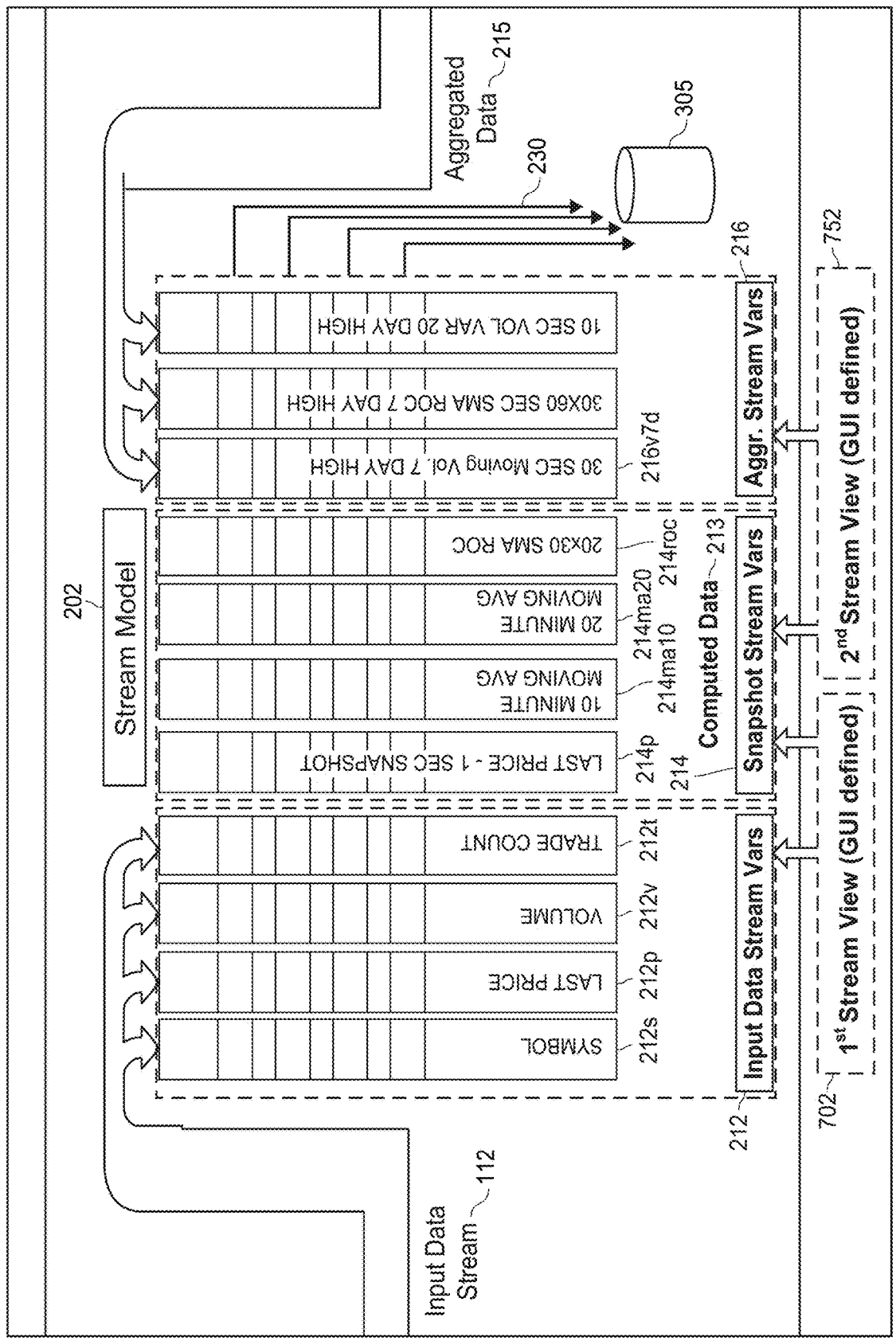
FIG. 2 illustrates an example stream model, in accordance with various aspects disclosed herein.

FIG. 2 illustrates an example stream model 202, in accordance with various aspects disclosed herein. As described for FIG. 1, a stream model (e.g., stream model 202) represents sessions of data streams (e.g., data streams 112$s$1-112$s$6) or otherwise data as ingested or captured over time and/or for a given time interval, e.g., by stream controller 102. As described herein, a stream model may also be referred to as a "stream sheet," as represented by tabular view data, such as a database table, as illustrated and described, for example, by FIG. 4 herein.

As described for FIG. 1, input data stream 112 may be ingested by stream controller 102 from computer network 320. And, as shown for FIG. 2, stream model 202 may ingest input data stream 112. Generally, data (e.g., such as data for each of input data stream(s) and/or snapshot data stream(s), aggregation data stream(s), as described herein) may be captured, generated, and/or stored in session(s) or otherwise at various time intervals or time snapshots, e.g., including at 1 minute, 5 second, 1 second, half-second, etc. It is to be understood that various sessions or time intervals are contemplated herein such that the data fidelity of the stream model may vary based on the data captured for, or at, different time intervals (e.g., 1-second intervals vs 1-minute intervals).

As shown for FIG. 2, in various aspects, one or more data streams may be configured by one or more declarative statement(s), indicating one or more data stream variables, and defined in a declarative language and as part of one or more declarative scripting modules accessible, implementable, or executable by a declarative scripting engine. In various aspects, the declarative scripting engine may comprise one or more declarative scripting modules comprising a declarative language modifiable to programmatically configure or adjust one or more data streams ingested by the stream controller 102. The declarative scripting engine operates by scanning or otherwise reading or analyzing the declarative scripting modules, and declarative language therein, in order allocate, reallocate, update, delete, or otherwise modify or adjust the data stream ingested, computed, and/or described for any one or more stream models (e.g., stream model 202). That is, the declarative scripting engine is comprised of software instructions (e.g., implemented in Java, C++, python, or other similar programming language) for reading or interpreting the declarative language of the declarative scripting modules, which are illustrated herein by FIGS. 6A-6D. As illustrated for FIGS. 6A-6D herein, the declarative language may comprise an object oriented programming type script used for configuring and/or querying data or data streams, and/or triggering signals or events based on stream variables and related stream data. Also, it is be understood that the declarative scripting language may comprise other formats, such as key-value pair, JSON formats, or the like whereby declarative scripting engine may access and read the declarative scripting language to configure the stream model(s) of the adaptable IoT platform.

In the example of FIG. 2, stream model 202 is configured with three sets of stream variables, including input data stream variables 212, snapshot stream variables 214, and aggregated stream variables 216, each of which represent programmatic variables in a declarative scripting module. Each of the stream variables of the stream model may also be referred to herein as stream columns of the stream model (i.e., stream sheet). Configuration of such variables is established through one or more declarative scripting modules (e.g., as described herein for FIG. 5A and FIGS. 6A-6D). As shown for FIG. 2, input data stream variables 212 comprise symbol 212$s$, last price 212$p$, volume 212$v$, and trade count 212$t$. The input data stream variables 212 cause stream controller 102 to ingest stream data (e.g., input data stream 112 and/or any of data streams 112$s1$-112$s6$) for the respective data types (e.g., symbol, last price, etc.). The ingested data may be stored in one or more memories (such as database 305). Such data may be captured or otherwise stored as a data session for a given time interval or period of time.

As a further example, snapshot stream variables 214 comprise last-price-minus-one-second 214$p$, 10-minute-moving-average 214$ma10$, 20-minute-moving-average 214$ma20$, and 20×30-simple-moving-average-rate-of-change 214$roc$. The snapshot stream variables 214 cause stream controller 102, or other computing instructions as described herein, to generate or otherwise compute or derive snapshot stream data 213 (e.g., data regarding last-price-minus-one-second, 10-minute-moving-average, 20-minute-moving-average, and 20×30-simple-moving-average-rate-of-change, etc.) based on input data stream 112. The snapshot data stream 213 (e.g., derived snapshot data stream as computed data) may be stored in one or more memories (such as database 305). Such data may be captured or otherwise stored as a data session (the same data session as input data stream 112) for a given time interval or period of time, such as the same give time interval or period of time for input data stream 112.

As a further example, aggregated stream variables 216 comprise 30-second-moving-volume-seven-day-high 216$v7d$ among other variables as shown for FIG. The aggregated stream variables 216 cause stream controller 102, or otherwise computing instructions as described herein, to generate or otherwise compute or derive aggregated data stream 215 (e.g., 30-second-moving-volume-seven-day-high, 30×60 second simple moving average (SMA) rate of change (ROC) 7-day high data, 10 second volume variance 20 day high data, etc.) based on input data stream 112 and/or snapshot data stream (snapshot data stream 213). The aggregated data stream 215 may be piped in or otherwise accessed from database 305.

In addition, the aggregated data stream 215 may be stored in one or more memories (such as database 305). Such data may be captured or otherwise stored as a data session (the same data session as input data stream 112 and/or snapshot data stream (e.g., snapshot data stream 213) for a given time interval or period of time, such as the same give time interval or period of time for input data stream 112 and/or snapshot data stream (e.g., snapshot data stream 213). FIG. 4, as shown and described herein, illustrates a session of data for a given moment in time or time interval of stream model 202.

The data as ingested, computed, and/or aggregated for stream model 202, as configured with three sets of stream variables, including input data stream variables 212, snapshot stream variables 214, and aggregated stream variables 216, may be used to trigger events 230. Events may also be referred to herein as signals. Events or signals may be based on a one or more of data streams signaling the occurrence of an identifiable event. Such an identifiable event may be caused when one or more of the ingested data from input data stream 112, the snapshot data stream 213, and the aggregated data stream 215 indicates a pattern or event trigger defined by a listener entity. The pattern or event trigger may defined (e.g., as a programming definition or function) by a listener declarative statement in the declarative scripting language in a declarative scripting module, as described herein for FIGS. 6A-6E.

In some aspects, stream model 202 may be created, updated, modified, or otherwise configured, such as with the three sets of stream variables, including input data stream variables 212, snapshot stream variables 214, and aggregated stream variables 216, via a stream view graphic user interface (GUI) that allows confirmation of stream views. One or more stream view GUIs may be used to programmatically, and graphically, configure one or more stream variables of a given stream model (e.g., stream model 202). In some cases (but not all), multiple stream views may be used to configure a stream model (e.g., stream model 202). For example, as shown for FIG. 2, and further described for FIGS. 7A and 7B herein, a first stream view GUI 702 is accessed to configure snapshot stream variables 214 comprising last-price-minus-one-second 214$p$, 10-minute-moving-average 214$ma10$, 20-minute-moving-average 214*ma*20, and 20×30-simple-moving-average-rate-of-change 214*roc*, as well as snapshot stream variables 214 comprising last-price-minus-one-second 214*p*, 10-minute-moving-average 214*ma*10, 20-minute-moving-average 214*ma*20. Further, as shown for FIG. 2, and further described for FIGS. 7A and 7B herein, a first stream view GUI 702 is accessed to configure or update stream model 202, including snapshot stream variables 214 to use or have snapshot stream variables 214 comprising 10-minute-moving-average 214*ma*10, 20-minute-moving-average 214*ma*20, and 20×30-simple-moving-average-rate-of-change 214*roc*, as well as aggregated stream variables 216 comprising 30-second-moving-volume-seven-day-high 216*v*7*d*.

Figure 3:
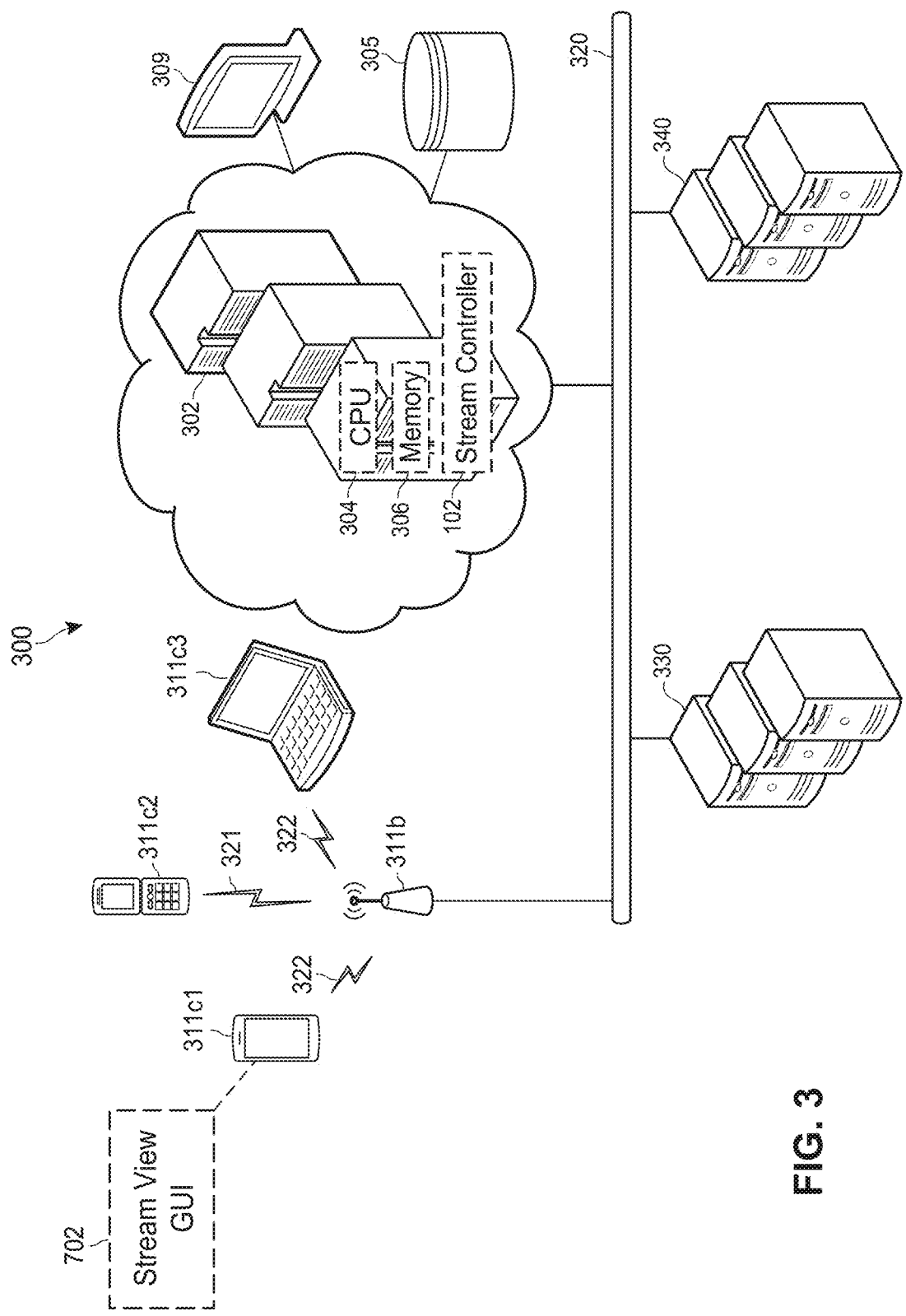
FIG. 3 illustrates an example adaptable internet-of-things (IoT) computing system, comprising the stream controller of FIG. 1, and configured for improved declarative control of streaming data, in accordance with various aspects disclosed herein.

FIG. 3 illustrates an example adaptable internet-of-things (IoT) computing system 300, comprising the stream controller 102 of FIG. 1, and configured for improved declarative control of streaming data 320, in accordance with various aspects disclosed herein. As illustrated for FIG. 3, stream controller 102 is communicatively connected to computer network 320, and configured to transmit and receive data across computer network 320. In the example aspect of FIG. 3, IoT computing system 300 includes server(s) 302, which may comprise one or more computer servers. In various aspects server(s) 302 comprise multiple servers, which may comprise multiple, redundant, or replicated servers as part of a server farm. In still further aspects, server(s) 302 may be implemented as cloud-based servers, such as a cloud-based computing platform. For example, data stream server(s) 302 may be any one or more cloud-based platform(s) such as MICROSOFT AZURE, AMAZON AWS, or the like. Server(s) 302 may include one or more processors 304 as well as one or more computer memories 306. In various aspects, server(s) 302 may be referred to herein as "data stream server(s)."

Memories 306 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memories 306 may store an operating system (OS) (e.g., Microsoft Windows, Linux, UNIX, etc.) capable of facilitating the functionalities, apps, methods, or other software as discussed herein.

Memories 306 may store a declarative scripting engine that comprises or access to one or more declarative scripting modules comprising a declarative language modifiable to programmatically configure one or more data streams ingested by stream controller 102. Data of the data streams may also be stored in memories 306. Additionally, or alternatively, data of the data streams, whether ingested or computed, may also be stored in database 305, which is accessible or otherwise communicatively coupled to data stream server(s) 302. In addition, memories 306 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processors 304.

The processors 304 may be connected to the memories 306 via a computer bus responsible for transmitting electronic data, data packets, or otherwise electronic signals to and from the processors 304 and memories 306 in order to implement or perform the machine readable instructions, methods, processes, elements or limitations, as illustrated, depicted, or described for the various flowcharts, illustrations, diagrams, figures, and/or other disclosure herein.

Processors 304 may interface with memories 306 via the computer bus to execute an operating system (OS). Processors 304 may also interface with the memory 306 via the computer bus to create, read, update, delete, or otherwise access or interact with the data stored in memories 306 and/or the database 305 (e.g., a relational database, such as Oracle, DB2, MySQL, or a NoSQL based database, such as MongoDB). The data stored in memories 306 and/or database 305 may include all or part of any of the data or information described herein, including, for example, data of data streams configured with input data stream variables 212, snapshot stream variables 214, and aggregated stream variables 216, and/or declarative scripting models (as described herein for FIGS. 6A-6E), or the like, or as otherwise described herein.

Data streams may be sourced from a variety of online sources, including IoT sources. These can include, by way of non-limiting example, a stock or market data, such as received by stock or market source 330 (e.g., data as received from INTERACTIVE BROKERS, QUANDL, or the like). As a further, example, weather data, such as received by a weather data source 340 (e.g., data as received from WEATHER UNDERGROUND, or the like).

Data stream server(s) 302 may further include a communication component configured to communicate (e.g., send and receive) data via one or more external/network port(s) to one or more networks or local terminals, such as computer network 320 and/or terminal 309 (for rendering or visualizing) described herein. In some aspects, data stream server(s) 302 may include a client-server platform technology such as ASP.NET, Java J2EE, Ruby on Rails, Node.js, a web service or online API, responsive for receiving and responding to electronic requests. The data stream server(s) 302 may implement the client-server platform technology that may interact, via the computer bus, with the memories 306 (including the applications(s), component(s), API(s), data, etc. stored therein) and/or database 305 to implement or perform the machine readable instructions, methods, processes, elements or limitations, as illustrated, depicted, or described for the various flowcharts, illustrations, diagrams, figures, and/or other disclosure herein.

In various aspects, the data stream server(s) 302 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 320. In some aspects, computer network 320 may comprise a private network or local area network (LAN). Additionally, or alternatively, computer network 320 may comprise a public network such as the Internet.

Data stream server(s) 302 may further include or implement an operator interface configured to present information to an administrator or operator and/or receive inputs from the administrator or operator. As shown in FIG. 3, an operator interface may provide a display screen (e.g., via terminal 309). Data stream server(s) 302 may also provide I/O components (e.g., ports, capacitive or resistive touch sensitive input panels, keys, buttons, lights, LEDs), which may be directly accessible via, or attached to, data stream server(s) 302 or may be indirectly accessible via or attached to terminal 309. According to some aspects, an administrator or operator may access the server 302 via terminal 309 to review information, make changes, update or code declarative scripting modules, and/or perform other functions as described herein.

In some aspects, data stream server(s) 302 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the declarative description modules(s), declarative scripting engine, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processors 304 (e.g., working in connection with the respective operating system in memories 306) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 3, data stream server(s) 302 are communicatively connected, via computer network 320 to the one or more user computing devices 311c1-311c3. In some aspects, base station 311b may comprise cellular base stations, such as cell towers, communicating to the one or more user computing devices 311c1-311c3 via wireless communications 321 based on any one or more of various mobile phone standards, including NMT, GSM, CDMA, UMMTS, LTE, 5G, or the like. Additionally, or alternatively, base station 311b may comprise routers, wireless switches, or other such wireless connection points communicating to the one or more user computing devices 311c1-311c3 via wireless communications 322 based on any one or more of various wireless standards, including by non-limiting example, IEEE 802.11a/b/c/g (WIFI), the BLUETOOTH standard, or the like.

Any of the one or more user computing devices 311c1-311c3 may comprise mobile devices and/or client devices for accessing and/or communications with data stream server(s) 302. Such mobile devices may comprise one or more mobile processors. In various aspects, user computing devices 311c1-311c3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

In various aspects, the one or more user computing devices 311c1-311c3 may implement or execute an operating system (OS) or mobile platform such as APPLE iOS and/or Google ANDROID operation system. Any of the one or more user computing devices 311c1-311c3 may comprise one or more processors and/or one or more memories for storing, implementing, or executing computing instructions or code, e.g., a mobile application, as described in various aspects herein. For example, as shown in FIG. 3, stream view GUI 310 may comprise an application that may also be stored locally on a memory of a user computing device (e.g., user computing device 311c1).

User computing devices 311c1-311c3 may comprise a wireless transceiver to receive and transmit wireless communications 321 and/or 322 to and from base station 311b. In various aspects, stream view GUI 310 may be used for adding to, deleting from, or otherwise updating stream model(s) (e.g., stream model 202) and/or for interacting with stream controller 102 and/or data stream server(s) 302. Still further, each of the one or more user computer devices 311c1-311c3 may include a display screen for displaying graphics, images, text, button, and/or other such visualizations or information as described herein. Still further, servers 302 may transmit outputs (e.g., output information, data, messages, notification, emails, and the like), based on events or signals when such events are triggered, e.g., based on any one or more of an input data stream, an snapshot data stream, and/or an aggregated data stream as described herein.

FIG. 4 illustrates an example data session 400 (e.g., a data capture view) of data active at a given time or time interval of the stream model 202 of FIG. 2, in accordance with various aspects disclosed herein. Data session 400 may be referred to herein as a stream sheet as represented by tabular view data, such as a database table. In the example of FIG. 4, data session 400 illustrates a session of data for a given moment in time or time interval of stream model 202. For example, as shown and described for FIG. 2, stream model 202 is configured with three sets of stream variables, including input data stream variables 212, snapshot stream variables 214, and aggregated stream variables 216. As shown for FIG. 4, data as ingested, computed, or aggregated is stored by row based on an ID (e.g., "_id," which can represent a unique ID, such as a primary key, in a database). Each row comprises a timestamp (e.g., "_time") at which the data was ingested, downloaded, received, computed, derived, aggregated, or otherwise stored in memory (e.g., database 305). The row can further be identified by data such as the ticker value.

In the example of FIG. 4, the data that is stored is based on the input data stream variables 212, snapshot stream variables 214, and aggregated stream variables 216, as define by the declarative scripting modules, e.g., as described herein for FIGS. 6A-6E. For example, input data stream variables 212, as defined in a declarative scripting module (e.g., FIG. 6A) cause data to be ingested, by stream controller 102, into stream model 202, as shown for each of the data values for symbol 212$s$, last price 212$p$, volume 212$v$, and trade count 212$t$ across the rows of FIG. 4

As a further example, snapshot stream variables 214, as defined in a declarative scripting module (e.g., FIG. 6A) causes data to be computed for stream model 202, as shown for each of the data values for last-price-minus-one-second 214$p$, 10-minute-moving-average 214$ma$10, 20-minute-moving-average 214$ma$20, and 20×30-simple-moving-average-rate-of-change 214$roc$ across the rows of FIG. 4.

As a still further example, aggregated stream variables 216, as defined in a declarative scripting module (e.g., FIG. 6B) causes data to be aggregated or otherwise determined for stream model 202 as shown for the data values for 30-second-moving-volume-seven-day-high 216$v$7$d$ across the rows of FIG. 4.

It is to be understood that FIG. 4 illustrates an example of data as ingested, computed, or aggregated for a stream model (e.g., stream model 202) and that data or a data session may comprise more or fewer records of data (e.g., rows) than as shown for FIG. 4

Figure 5A:
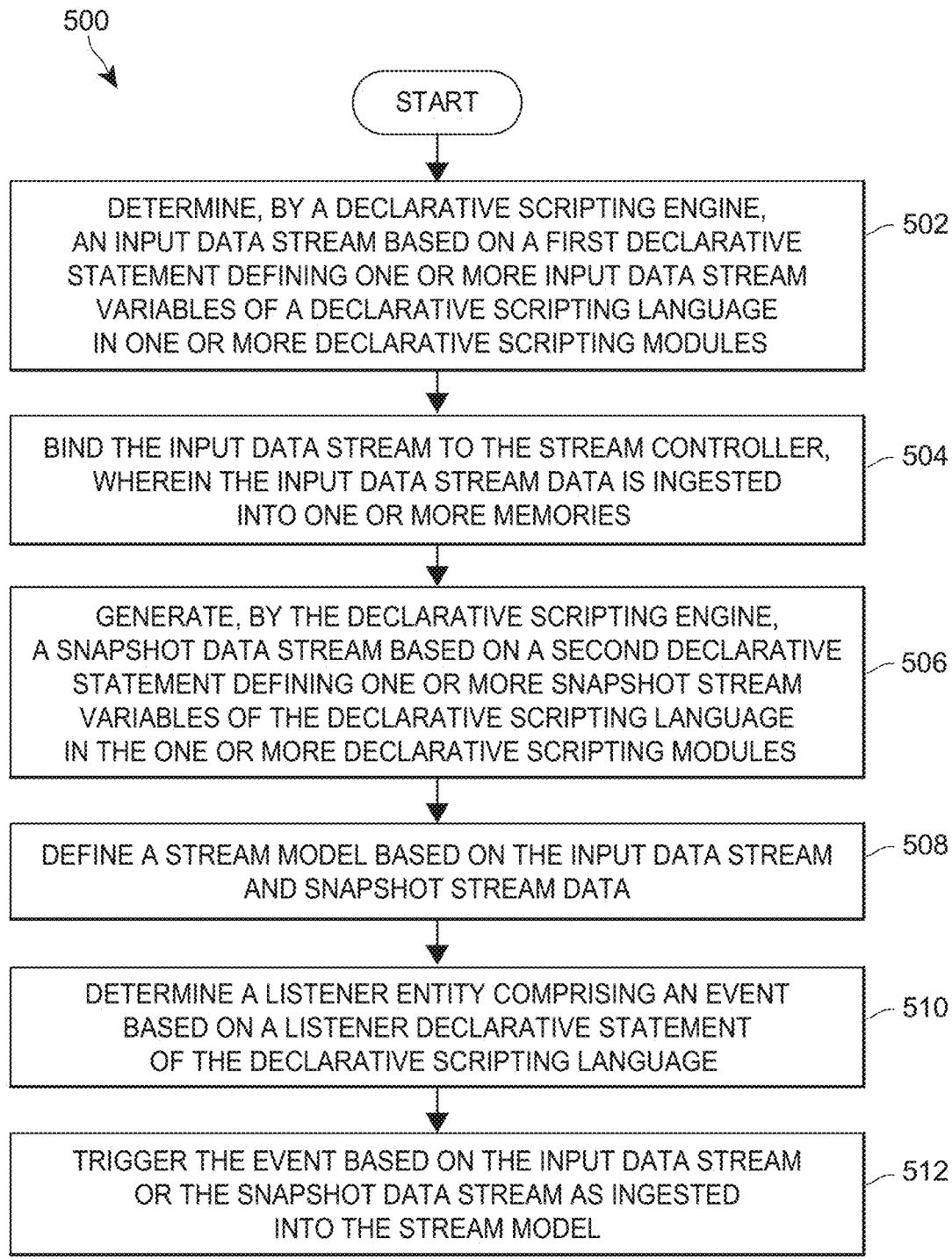
FIG. 5A illustrates an example adaptable internet-of-things (IoT) computing method for improved declarative control of streaming data, in accordance with various aspects disclosed herein.

FIG. 5A illustrates an example adaptable internet-of-things (IoT) computing method 500 for improved declarative control of streaming data, in accordance with various aspects disclosed herein. It should be noted that adaptable IoT computing method 500 illustrates an algorithm for implementing improved declarative control of streaming data. The algorithm of method 500 may be implemented via computing instructions as coded in Java, C++, Python, or the like.

At block 502, adaptable IoT computing method 500 comprises determining, by a declarative scripting engine, an input data stream based on a first declarative statement defining one or more input data stream variables of a declarative scripting language in one or more declarative scripting modules. The input data stream may be configured through input data stream variables 212, as described herein for FIGS. 6A-6E. The input data stream, as configured, may be ingested, received, or otherwise input into stream model 202 as described herein. The declarative scripting engine analyzes the snapshot stream variables 214 and opens connections (e.g., server-client connections) for the data stream to be downloaded or streamed from data sources (e.g. market data service 330 and/or weather data service 340) across the computer network 320. For example, in one aspect, the input data stream may be time series data. The time series data may comprise market data (e.g., as received from market data service 330, which may be from INTERACTIVE BROKERS and/or QUANDL data services). Additionally, or alternatively, the time series data may comprise weather data (e.g., as received from WEATHERUNDERGROUD or the like). Additionally, or alternatively, such data may comprise data that is scraped or retrieved from web pages, RESTful APIs, or other computer related data sources accessible via computer network 320.

At block 504, adaptable IoT computing method 502 comprises binding the input data stream to a controller (e.g., stream controller 102), wherein the input data stream data is ingested into one or more memories (e.g., memories 306 and/or database 305). The data may be distributed in a clustered environment (e.g., clustered compute environment 100), which is further described, for example, for FIG. 2 and FIG. 5B.

At block 506, adaptable IoT computing method 500 comprises generating, by the declarative scripting engine, a snapshot data stream based on a second declarative statement defining one or more snapshot stream variables (e.g., snapshot stream variables 214) of the declarative scripting language in the one or more declarative scripting modules. An example of the snapshot stream variables is illustrated by FIG. 6A herein. In various aspects, the snapshot stream (e.g., as defined by snapshot stream variables 214) are computed or derived from the input data stream (e.g., as defined for the input data stream variables 212) and ingested into the one or more memories. Such computation or derivation may occur in real-time or near-real time. That is, declarative scripting engine may generate or compute snapshot stream data based on snapshot stream variables 214 (which are based on input data stream variables 212), which may occur in real-time or near real-time. The snapshot stream data may store on database 305 and/or pushed or published to stream model 202 for analysis and/or event triggering as described herein.

At block 508, adaptable IoT computing method 500 comprises defining a stream model (e.g., stream model 202) based on the input data stream and snapshot stream data. The stream model may ingest, compute, or otherwise receive data streams (e.g., input data stream 112, snapshot data stream 213, and/or aggregated data stream 215) as described herein. In various aspects, a stream model (e.g., stream model 202) may comprise session of data, including a input data stream, a snapshot data stream, and/or a aggregated data stream 215 taken at a session time interval (e.g., for a 1 second period of time).

At block 510, adaptable IoT computing method 500 comprises determining a listener entity comprising an event (e.g., event 230) based on a listener declarative statement of the declarative scripting language. An example listener entity and event are defined in declarative scripting module 630, which is described herein with respect to FIG. 6C.

Figure 5B:
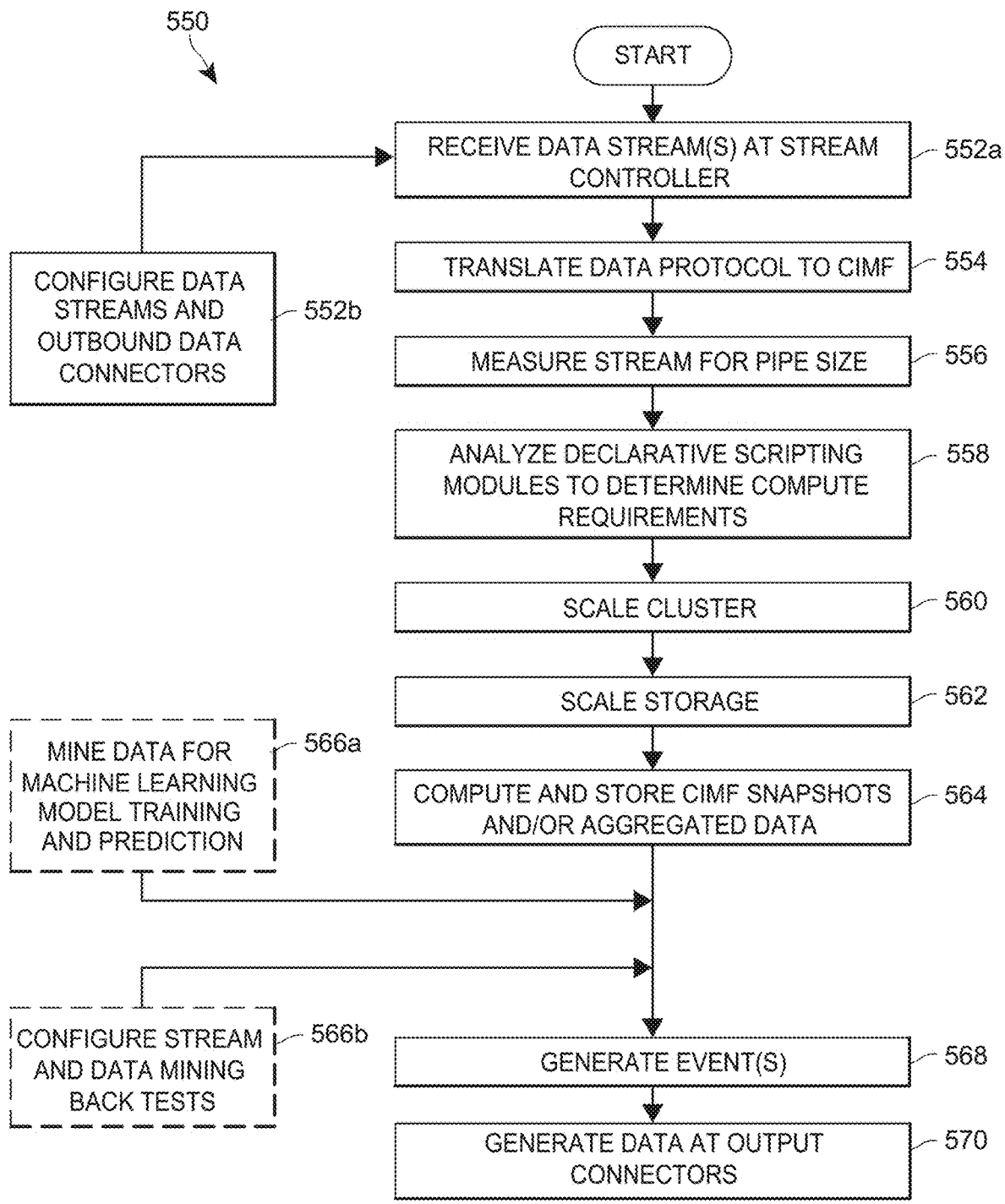
FIG. 5B illustrates a further example adaptable internet-of-things (IoT) computing method for improved declarative control of streaming data, in accordance with various aspects disclosed herein.

At block 512, adaptable IoT computing method 500 comprises triggering the event based on the input data stream or the snapshot data stream as ingested into the stream model. The event trigger may cause data output on outbound output connectors. The output connectors may comprise outputs on computer network 320. For example, the output connectors allow IoT computing system 300 to integrate with other systems, e.g., across computer network 320 or local networks or systems. Such output connectors may comprise output to systems configured for control of devices, automated trading, training or using machine learning models, or the like, as the data captured and analyzed by IoT computing system. Such trigger and event notification provides machine learning or other artificial intelligence systems a large dataset to learn with compared to conventional datasets. The outputs may comprise, e.g., key events (e.g., trade events), label variables, output information, data, messages, notification, emails, and the like), based on events or signals when such events are triggered, e.g., based on any one or more of an input data stream, an snapshot data stream, and/or an aggregated data stream as described herein FIG. 5B illustrates a further example adaptable internet-of-things (IoT) computing method 550 for improved declarative control of streaming data, in accordance with various aspects disclosed herein. It should be noted that adaptable IoT computing method 550 illustrates an algorithm for implementing improved declarative control of streaming data. The algorithm of method 500 may be implemented via computing instructions as coded in Java, C++, Python, or the like.

At block 552*a*, adaptable IoT computing method 550 comprises receiving one or more data streams (e.g., IoT data streams). Such data streams may be those ingested by the stream controller 102 or otherwise by servers 302 as described herein.

At block 552*b*, adaptable IoT computing method 550 comprises configuration of the data streams and output data connectors. Configuration of the data streams comprises programmatic configuration of the declarative scripting modules, where the data streams to be ingested by a stream controller (e.g., stream controller 102) or otherwise by servers (e.g., servers 302) are defined as stream variables declarative scripting modules. Similarly, configuration of output data connectors (e.g., events and triggers) may also be programmatically configured with the declarative scripting modules. Such output data connectors allow the adaptable IoT computing system 300 to produce outputs based on analysis of stream models or otherwise data stream(s) ingested or computed for such stream models (e.g., stream model 202). Examples of the declarative scripting modules with such programmatic configuration are further illustrated and described herein for FIGS. 6A-6E. The code or otherwise configurations or script of declarative scripting modules may be modified, updated, or changed by an administrator or programmer, e.g., by accessing terminal 109. Additionally, or alternatively, the code or otherwise configurations or script of declarative scripting modules may be modified, updated, or changed by a user (such as an unskilled user) via one or more stream view GUIs, for example, as described herein for FIGS. 7A and 7B.

At block 554, adaptable IoT computing method 550 comprises, in some aspects, translating the incoming data stream (e.g., IoT data stream) into common information model format for storage by system 300 (e.g., in database 305) and/or for use by one or more stream models (e.g., stream model 202). For example, in various aspects, an input data stream (e.g., input data stream 112) may be converted into a common information model format for ingestion by the stream controller. In this way, input data streams may be translated based on using open source protocol standards (e.g., JSON, XML, etc.) into a proprietary common information model) for universal data processing across the system. An example of the common information model format is shown and described for FIG. 4 herein, illustrating a data session, as useable by a session model (e.g., stream model 202), which is formatted in the common information model format. The data in the data session, e.g., as shown for FIG. 4, may been ingested from multiple data sources, each having a different data format, data type, data amount, or is otherwise inconsistent or incompatible with one another. The common information model format formats the data to be consistent and streamlined for ingestion, computation, or otherwise input into or use by a stream model (e.g., stream model 202).

At block 556, adaptable IoT computing method 550 comprises measuring one or more data streams for pipe size (e.g., bandwidth or amount of data received).

At block 558, adaptable IoT computing method 550 comprises analyzing, by the declarative scripting engine, the one or more declarative scripting modules (e.g., as illustrated for FIGS. 6A-6E) in order to determine the one or more data streams (e.g., input data stream 112, snapshot data stream 213, and/or aggregated data stream 215) in order to configure the compute requirements for configuring stream controller 102 (or otherwise servers 302) to ingest and/or compute data based on the pipe size, type, or amount of data streams to be analyzed or otherwise received by one or more stream models (e.g., stream model 202).

At block 560, adaptable IoT computing method 550 comprises using the compute requirements, and/or other information or requirements, as determined in blocks 552a-558 to scale a computing cluster. The computing cluster may comprise, for example, clustered compute environment 100 or otherwise one or more computers, e.g., such as servers 302 or a server farm. Scaling the cluster comprises determining the number and/or type of node (e.g., virtual server or physical sever) to allocate or deallocate for the given compute requirements. Fewer nodes are needed when the pipe size or otherwise data received or ingested, as determined by stream controller 102, is low. Conversely, more nodes are needed when the pipe size or otherwise data received or ingested, as determined by stream controller 102, is high. Also, the number of nodes may also be determined by the number of declarative statements across the declarative scripting modules. For example, in various aspects, computer-executable instructions further comprise instructions, that when executed by the one or more processors (e.g., processors 304), cause the one or more processors to scale a compute cluster size corresponding to the stream controller analyzing or otherwise based on at least one of a number of messages included in the input data stream (e.g., input data stream 112) or one or more statements in the declarative scripting modules (as described herein for FIGS. 6A-6E), which can include the a declarative statement for the input data stream variables 212, a declarative statement for the snapshot stream variables 214, a declarative statement for the aggregated stream variables 216, a listener declarative statement, or other declarative statement in the declarative scripting modules as described herein.

In this way, at blocks 556-560, represent the activity performed by stream controller 102 and declarative scripting engine. For example, stream controller 102 can be an elastic compute cluster that is used for both stream computing and for data mining. Stream data may be constantly measured for pipe by stream controller 102, which may scale a compute cluster (e.g., clustered compute environment 100 and/or servers 302) dynamically, where such computing resources can be downsized or upsized as needed. Additionally, or alternatively, the declarative script modules may also be constantly analyzed or scanned, by the declarative scripting engine, to determine the number of declarative statements, and therefore the size of the needed compute requirement, which is also used for dynamically configuration the compute cluster. For example, in some aspects, computer-executable instructions of stream controller 102, or otherwise executing on processors 304, may execute to scale the cluster size down to reduce at least one of: (i) processor resources, or (ii) memory resources of the cluster, based on the data ingested and/or computed, and/or the declarative statement number and/or type. Still further, the computer-executable instructions of stream controller 102, or otherwise executing on processors 304 may reallocate one or more nodes executing in the compute cluster. Still further, the computer-executable instructions of stream controller 102, or otherwise executing on processors 304 may suspend one or more nodes of the compute cluster based on data pipe size in the compute cluster.

At block 562, adaptable IoT computing method 550 comprises scaling storage of ingested data and/or computed data (e.g., any one or more of input data stream 112, snapshot data stream 213, and/or aggregated data stream 215) into one or more memories, e.g., database 305. Scaling the storage may comprise distributing and storing the data across the computing nodes (e.g., servers 302) based on the compute requirements. The data, when scaled, can be reduced (e.g., once received or computed) to reduce memory storage requirements through the scaled cluster, which may comprise one or more computing devices (e.g., servers 302 in a server farm).

At block 564, adaptable IoT computing method 550 comprises computing and storing snapshot data and/or aggregated data (e.g., snapshot data stream 213 and/or aggregated data stream 215) into the common information model format data in the computing nodes (e.g., servers 302) for use by the one or more stream models (e.g., stream model 202) as described herein, e.g., for FIG. 2. For example, all real-time and/or near real-time streaming data converted into the common information model format with computed values based on a declarative statement may be stored into a database (e.g., a MongoDB). As an example, such data may be stored at one second intervals, which may be used to trigger events as well. Such flexibility allows for scaling storage and/or processing of the adaptable IoT computing platform on demand.

At block 566*a*, adaptable IoT computing method 550 comprises, in some aspects, training and executing a machine learning model in order to predict or classify one or more pattern event triggers as identified by the data streams as ingested or computed for the stream models (e.g., stream model 202). That is, in some aspects, a machine learning model is trained on training data comprising the one or more data streams (e.g., input data stream 112, snapshot data stream 213, and/or aggregated data stream 215) and event data of one or more events (e.g., events 230) as triggered based on the one or more data streams. More specifically, a machine learning model may be trained using a supervised or unsupervised machine learning program or algorithm. The machine learning program or algorithm may employ a neural network, which may be a convolutional neural network, a deep learning neural network, or a combined learning module or program that learns in two or more features or feature datasets, which may comprise data of the one or more data streams (e.g., input data stream 112, snapshot data stream 213, and/or aggregated data stream 215). The machine learning programs or algorithms may also include automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on data stream server 302. For example, libraries may include the TENSORFLOW based library, the PYTORCH library, and/or the SCIKIT-LEARN Python library.

Machine learning may involve identifying and recognizing patterns in existing data, such as stream data, whether ingested or computed (e.g., data of the one or more data streams, including input data stream 112, snapshot data stream 213, and/or aggregated data stream 215) in order to facilitate making predictions or identification for subsequent data (such as determining when and which event triggers are to be triggered). Event triggering can be determined based on one or more threshold of data stream(s) being met, where the combination or otherwise breach of the threshold, may trigger an event or signal, e.g., a stock trading event or a weather event.

Machine learning model(s), such as the machine learning model herein, may be created and trained based upon example data (e.g., "training data," e.g., input data stream 112, snapshot data stream 213, and/or aggregated data stream 215) as inputs or data (which may be termed "features" and "labels") in order to make valid and reliable predictions for new inputs, such as testing level or production level data or inputs (e.g., for determining event triggers). In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based on the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

With reference to block 566*a*, a machine learning model may be trained and configured by mining or otherwise accessing stored data (e.g., "training data," e.g., input data stream 112, snapshot data stream 213, and/or aggregated data stream 215) to predict or classify one or more pattern event triggers based on one or more combinations of the one or more data streams and the event. The machine learning model may comprise one or more autonomous machine learning models that access stored data (e.g., data stream and computed data stored in database 305, and as illustrated for FIG. 4) to learn predicable patterns without human intervention. The AI model can be used to drive an automated system (e.g., automated system 300), which may comprise a portfolio trading strategy based on a risk management determined by the trained machine learning model. In some aspects, the machine learning model, based on its predictions or classifications, may make the trading decisions as it continues to learn and recognize profitable patterns.

At block 566*b*, adaptable IoT computing method 550 comprises configuring stream and data mining in order to perform back tests. In such aspects, the data streams are synthetic data streams, where the synthetic data streams are fed into one or more stream models (e.g., stream model 202) in order to test IoT computing system 300. Such test can be performed without access to live data, and can be performed to train the machine learning model as described herein, such as to train the model to detect specific triggers or patterns (e.g., trade signals or weather events). Back testing and data mining may also be configured to develop the declarative scripting modules (e.g., as described herein for FIGS. 6A-6E). The back test may be run in a clustered environment, where the stream controller configures a cluster (e.g., clustered compute environment 100) or stream model (e.g., stream model 202) to receive synthetic data for the back tests.

In various aspects, the declarative scripting modules are configurable to modify the declarative scripting engine to implement one or more of determining a range of dates that can be used to perform back tests by analyzing the one or more respective dependencies and/or or performing one or more data mining operations on stored data falling within the range of dates. In this way, declarative scripting modules may include stream variables that depend on one another and/or entity events. Based on the dependencies, a range of dates can be provided to run back tests. The back tests may be performed the same as for live ingested data stream, but where synthetic data (as opposed to live data) is injected and synthetic event triggers are determined based on stored or captured data.

At block 568 adaptable IoT computing method 550 comprises generating event(s). The events may be defined in a declarative scripting module, for example, as described herein for FIGS. 6A-E. In various aspects, the declarative scripting engine may determine a listener entity, in a declarative scripting module (e.g., as describe for FIG. 6C). The listener entity may comprise an event based on a listener declarative statement of the declarative scripting language. The event can be triggered based on any one or more of input data stream 112, snapshot data stream 213, and/or aggregated data stream 215 as ingested into the stream model (e.g., stream model 202).

Figure 6D:
FIG. 6D illustrates a further example declarative scripting module implementing a declarative scripting language, in accordance with various aspects disclosed herein.

At block 570 adaptable IoT computing method 550 comprises generating data at the output connectors. The output connectors may comprise outputs on computer network 320. The outputs may comprise, e.g., output information, data, machine learning label variables, messages, notification, emails, and the like), based on events or signals when such events are triggered, e.g., based on any one or more of an input data stream, an snapshot data stream, and/or an aggregated data stream as described herein FIG. 6A illustrates an example declarative scripting module 600 implementing a declarative scripting language, in accordance with various aspects disclosed herein. The declarative scripting module may be implemented in a declarative language using an object oriented programming type script or style used for configuring and/or querying data or data streams, and/or triggering signals or events based on stream variables and related stream data. This object oriented programming type script or style is illustrated for FIG. 6A and also for FIGS. 6B-6E, and is shown as source code, or as pseudocode, as examples for implementing the declarative scripting language and related declarative scripting modules as described herein. It is to be understood, however, that other declarative styles or formats may be used, including, by way of non-limiting example, a text file with key-value pairs, a file formatted according to the JavaScript Object Notation (JSON) format, or the like.

Declarative scripting module 600 illustrates the declarative language for processing entity and time series-based data streams from data (e.g., IoT data or other data as received at server 302). In particular, declarative scripting module 600 illustrates market tick stream data, and relates to stream model 202 of FIG. 2. As shown for declarative scripting module 600, various declarative statements may be used to configure or determine input data streams for stream model 202. Each stream variable defined in declarative scripting module 600 represents a stream of data (i.e., a column of data) that is ingested into, or computed for, stream model 202. For example, lines 2-7 include variables that comprise input data stream variables 212 that define input data stream variables symbol 212$s$, last price 212$p$, volume 212$v$, and trade count 212$t$, among others. It should be noted that line 2 ends with "ID" showing that the variable for symbol 212$s$ is used as to map streaming data to a specific entity in the declarative scripting engine. That is, an entity in the declarative scripting engine may comprise an instantiated object, or other in-memory data object or structure. Such an entity may be represented by a row of data (as shown for FIG. 4) that may be referenced or tracked by an ID (e.g., "_id"). It should be noted that lines 2-7 defining input data stream variables 212 may be used to configure stream controller 102 to implement or execute a back-end (e.g., server) data connector to receive data input (e.g., across computer network 320) from any type of entity stream (e.g., as provided by market data service 330 and/or weather data service 340) at server 302.

The declarative scripting modules include declarative language for injecting one or more respective dependencies of one or more stored variables and one or more stored entity events. For example, snapshot stream data 214 may be derived or computed based on input data stream data. Such relationship can be configured in the declarative language by stream variables, as illustrated for declarative scripting module 600. For example, line 10, relating to snapshot stream variables 214, causes declarative scripting engine to compute, determine, or create last-price-minus-one-second 214$p$ from last price 212$p$. Lines 11 and 12 define further snapshot stream variables 214 to create further snapshot streams based on data streams configured by data stream variables 212. Similarly, lines 15-16 demonstrate snapshot stream variables 214 used to apply, by declarative scripting engine, a computation or formula that can use other variable data streams as inputs. For example line 15 of declarative scripting module 600 takes an average of the last 600 data values set on a one second session update to compute a 10-minute moving average. Lines 20-21 compute rate of changes between moving averages, lines 24-25 create moving counts for volume and trade count, and lines 28-29 demonstrates creation of trade bars by using a snapshot expression that subtracts the current volume value or trace count value, respectively, from what the respective value was 30 seconds in the past.

FIG. 6B illustrates a further example declarative scripting module 610 implementing a declarative scripting language, in accordance with various aspects disclosed herein. Declarative scripting module 610 comprises instructions that causes the generation or establishment of an aggregated data stream based on a declarative statement defining one or more aggregated stream variables of the declarative scripting language.

The aggregated data stream is derived from at least one of the input data stream data as defined by the data stream variables 212 or the snapshot data stream as defined by the snapshot stream variables 214. Declarative scripting module 610 causes the stream model (e.g., stream model 202) to comprise or receive the aggregated data stream 215. In particular, declarative scripting module 610 illustrates how aggregated data stream 215 is injected based on data ingested, computed, or determined from other (e.g., previous) stream sessions (e.g., from data stream defined by defined by the data stream variables 212 or the snapshot data stream as defined by the snapshot stream variables 214) into or with the same context with real-time, or near real-time, computed variables to allow stream model 202 to comprise multiple data stream for building complex queries that allow for aggregated and real-time (or near real-time) data for event triggering. For example, line 2 of declarative scripting module 610 defines a stream variable that causes declarative scripting engine to generate and store the highest moving volume 30 second value found over the last 7 days (e.g., 30-second-moving-volume-seven-day-high 216$v7d$). This is performed by determining or computing stream variables at one-second variables (e.g., as defined by snapshot stream variables 214). Lines 4 and 6 follow the same pattern but for different variables.

In some aspects, the data defined by declarative scripting module 610 is generated in batches, such as aggregated data generated in batch jobs (e.g., which may be nightly to build a data set for each variable), where such data is generated based on aggregated stream variables (e.g., aggregated stream variables 216) for each entity that is configured to compute the average, high, low and other related aggregated metrics. In some aspects, the aggregated data may be generated or batched in parallel (e.g., multi-threaded) to improve performance. In still further aspects, the aggregated values may be stored in server 302 and/or database 305, and the aggregated data stream 215 may be pulled or requested into stream model 202 to create a data session as described herein, for example, as illustrated for FIGS. 2 and 4. Aggregated data (e.g., aggregated data stream 215) may also be ingested as synthetic data for machine learning, back testing, and/or data mining purposes as described herein.

FIG. 6C illustrates a further example declarative scripting module 630 implementing a declarative scripting language, in accordance with various aspects disclosed herein. Declarative scripting module 630 includes declarative statements regarding event triggers and listeners. By analyzing declarative scripting module 630, one or more processors implementing computing instructions (e.g., computing instructions of the declarative scripting engine), may determine a listener entity comprising an event based on a listener declarative statement of the declarative scripting language. The event defined by the declarative scripting module 630 may be triggered based on the input data stream, the snapshot data stream, and/or the aggregated data stream as ingested into a stream model (e.g., stream model 202).

As shown for FIG. 6C, line 1 of declarative scripting module 630 illustrates how to define an event (referred to as an "Entity Event") with the declarative language for stream processing. The event provides a callback or hook to be triggered when a condition is met, e.g., in the example of declarative scripting module 630, an event defining a 30 day volume breakout ("Volume 30 Day Breakout"). Line 3 defines a listener entity (referred to as an "Entity Class") with the declarative language for stream processing. The listener entity (Entity Class) instructs the one or more processors implementing computing instructions (e.g., computing instructions of the declarative scripting engine) to instantiate (e.g., automatically instantiate or auto-instantiate) an instance of the listener entity (Entity Class) for a given stream variable, e.g., in the example of declarative scripting module 630, stream variable "VolumeBar30Sec" which causes ingestion or computation of data stream(s) (e.g., input data stream 112, snapshot data stream 114, and/or aggregated data stream 216) into a stream model (e.g., stream model 202) of 30 second volume bar data. That is, the entity classes may be automatically instantiated for each stream variable defined in a given declarative scripting module (e.g., declarative scripting module 630) for a given listener entity (Entity Class). For example, in the context of system 300, the one or more processors implementing computing instructions (e.g., computing instructions of the declarative scripting engine) may be configured to automatically generate an instance of an entity class corresponding to the listener entity. In various aspects, the objects may be instantiated in an underlying programming language, such as Java, C++, C#, python or the like.

In this way, the listener entity (Entity Class) listens, or otherwise tracks or monitors, 30 second volume bar data for determination of when to trigger an event based on one or more data stream. This improves the system by creating a flexible and dynamic approach to configuring multiple data streams and potential listeners, with the use of one or entity classes, listeners, and events as defined in a declarative scripting module (e.g., declarative scripting module 630) and instantiated in computer memory.

With further reference to FIG. 6C, lines 5-6 of declarative scripting module 630 defines a function that is invoked when the VolumeBar30Sec stream variable is updated, e.g., when data is ingested or computed for VolumeBar30Sec, which is then provided into a stream model (e.g., stream model 202). Further, lines 9-10 of declarative scripting module 630 illustrate a declarative if-statement to determine whether a current value of the VolumeBar30Sec stream variable is greater than 3000% of the aggregated 30 day high (VolumeBar30secHigh30Day), and, if so, the one or more processors implementing computing instructions (e.g., computing instructions of the declarative scripting engine) triggers the event ("Entity Event") as defined on line 1 of the declarative scripting module 630. The event ("Entity Event") may be linked to a callback function or other computing statement that provides output, e.g., a notification, message, or other indication that an event has been triggered, such that additional software or hardware may react to the event trigger. In the example of declarative scripting module 630, the event relates to a 30 day volume breakout, which may be a trigger to allow a trading platform to enter a trade, exit a trade, signal on a GUI that the breakout has occurred, send communications (e.g., email) regarding the event, or other such output based on the event.

In some aspects, an annotation (e.g., "@VarListenerType") may be added in a declarative scripting module where the annotation invokes a callback function when a specific event type is triggered. An event type may relate to a broad category of data, e.g., such as data for a given stock or asset, or weather data at a certain zip code or location, or any other category of data pertaining to a specific end use. In this way, event processing can be implemented, through declarative scripting module(s), by instantiating entity classes that can produce and react to event triggers of specific types or categories. In some aspects, auto instantiation of such entity types or classes for specific signal types can be created, where the entity types or classes may correspond to triggers for given triggering criteria. For example, in the context of system 300, the one or more processors implementing computing instructions (e.g., computing instructions of the declarative scripting engine) may be configured to instantiate an instance of an entity class corresponding to a listener entity. The entity class may comprise a code annotation (e.g., "@VarListenerType") including an event type descriptor (e.g., "TSLA Stock") and associated with a callback function ("TSLA_trigger"), where the code annotation causes the one or more processor to invoke the callback function in response to receiving an event (e.g., "volume breakout" or "price breakout" of TSLA stock) matching the type of the event type descriptor.

FIG. 6D illustrates a further example declarative scripting module 640 implementing a declarative scripting language, in accordance with various aspects disclosed herein. Generally, declarative scripting module 640 illustrates how dynamic GUI views (also referred to herein as "stream views" or stream view GUIs, as illustrated for FIGS. 7A and 7B) can be programmatically built or otherwise configured to interact with the other declarative modules, as described herein for FIGS. 6A-6E. In this way, various stream views may be used to interact, control, update, and/or configure the IoT computing system 300, stream models (e.g., stream model 202), as described herein.

In the example of FIG. 6D, a stream view ("Trending Entity Stream View") is defined comprising a query expression ("Query," at lines 2-4) that can combine or otherwise use data of input stream variables 212 and aggregated stream variables 216. It is to be understood, however, that any of stream variables 212, snapshot stream variables 214, and/or aggregated stream variables 216, may be used. The query expression (Query) causes a result set of entities to be returned that match the query criteria of the query expression. Lines 6-10 of declarative scripting module 640 define stream variables of the data streams that bind to, or are otherwise required for, the query expression (Query). When a query expression (Query) is executed, a stream view GUI is dynamically created from a query being sent (e.g., asynchronously sent) to one or more compute controllers (e.g., stream controller 102) where the controller interfaces with related stream models (e.g., stream model 202), which may be executing on one or more nodes in a cluster. The one or more nodes returns its results to the controller and the controller combines node results to return one result set. The result set can be returned to a stream view in order to reflect the stream views (and in some cases, the nodes and/or computer nodes) that have been allocated, relocated, or otherwise modify or updated based on the query.

Stream view based declarative scripting modules (such as declarative scripting module 640) may be coded by a programmer. Additionally, or alternatively, stream view based declarative scripting modules (such as declarative scripting module 640) may be programmatically generated top-down by manipulating stream view GUIs (e.g., as illustrated herein for FIGS. 7A and 7B). Additionally, or alternatively, the declarative scripting modules may be used to build or generate, in a bottom-up manner, the stream views (from analysis of the code), in order to generate the streams as shown on a given stream view GUI (e.g., as illustrated herein for FIGS. 7A and 7B).

FIG. 6E illustrates a further example declarative scripting module 650 implementing a declarative scripting language, in accordance with various aspects disclosed herein. FIG. 6E illustrates that the declarative scripting modules are flexible to allow for IoT computing system 300 to ingest different types of information as used for different applications or otherwise end uses. As shown for FIG. 6E, the same declarative scripting language is used as for declarative scripting module 650 of FIG. 6A. However, declarative scripting module 650 comprises stream variables for ingesting weather related data (instead of stock or market data). In this way, FIG. 6E illustrates how the same declarative scripting language, operating on the same IoT computing system 300, can be adaptively applied or reused for weather data streams using the same types of stream variables, entity events, triggers, entity classes, etc. as for financial markets, as illustrated for FIGS. 6A-6D.

For example, as shown for FIG. 6E, lines 2-6 defining input data stream variables 212 may be used to configure stream controller 102 to implement or execute an input data connector to receive data input (e.g., across computer network 320) from weather data service 340. The data requested, in the example of FIG. 6E, comprises humidity, visibility, pressure, wind, and temperature. Aggregated stream variables 216 may be computed based on the input data stream variables 212 of FIG. 6E, where the aggregated stream variables 216 comprise the 30-day high for wind speed ("WindHigh30Day").

Still further, trigger events 230 may be setup based on the 30-day high for wind speed. As shown for FIG. 6E, lines 11-24 of declarative scripting module 650 illustrate a declarative if-statement to determine whether a current value a wind speed (Wind[0] is greater than of the aggregated 30 day high (WindHigh30Day), and, if so, the one or more processors implementing computing instructions (e.g., computing instructions of the declarative scripting engine) triggers the event ("Entity Event") as defined on line 12 of the declarative scripting module 650. The event ("Entity Event") may be linked to a callback function or other computing statement that provides output, e.g., a notification, message, or other indication that an event has been triggered, such that additional software or hardware may react to the event trigger. In the example of declarative scripting module 650, the event relates to a 30 day wind speed, which may be a trigger when the wind speed is higher than it has been on the past 30-days to allow an indication that wind speed has changed and/or to signal on a GUI that the wind speed has occurred, send communications (e.g., email) regarding the event, or other such output based on the event.

Figure 7A:
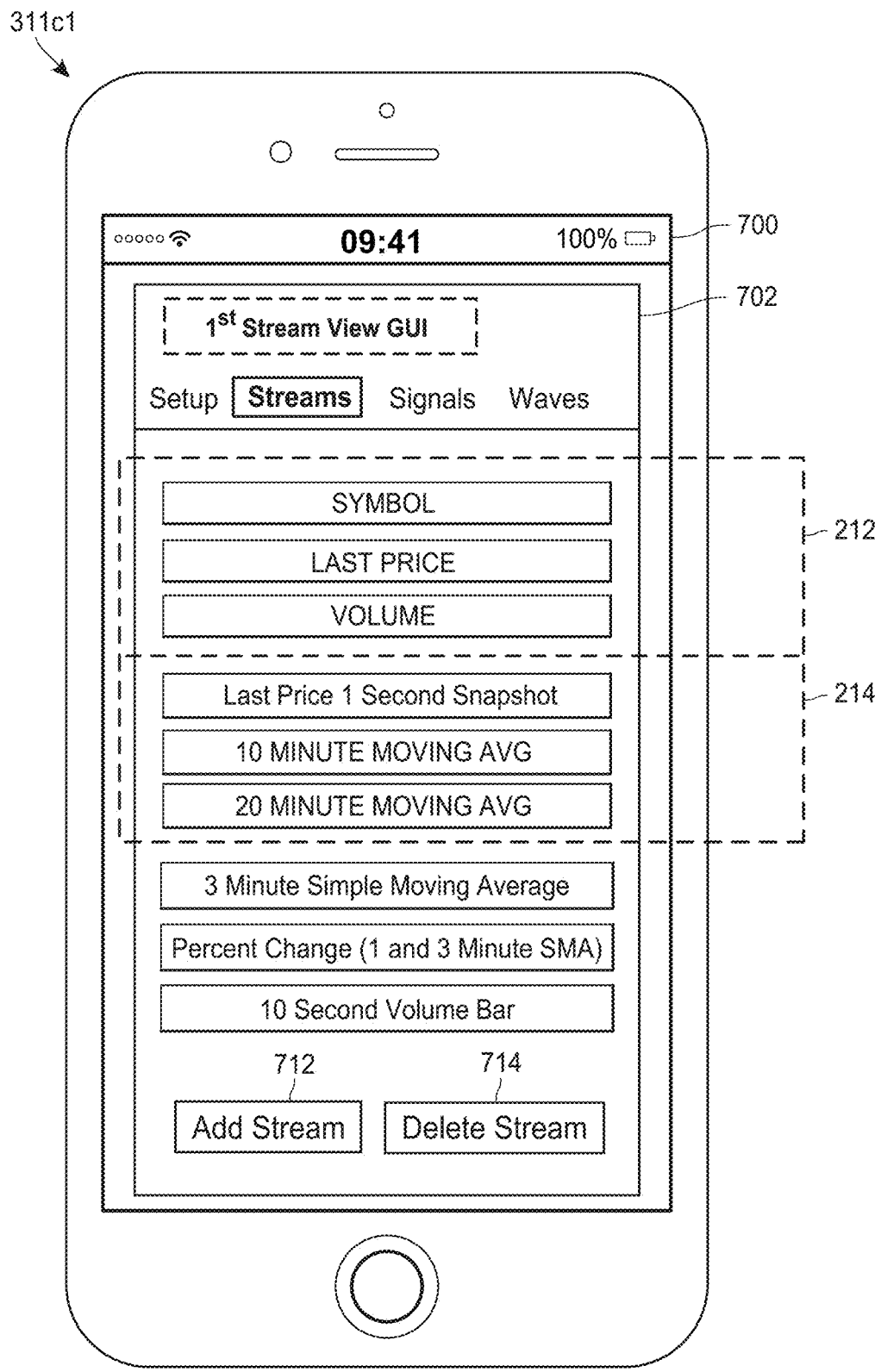
FIG. 7A illustrates an example stream view graphic user interface (GUI), in accordance with various aspects disclosed herein.

FIG. 7A illustrates an example stream view graphic user interface (GUI) 702, in accordance with various aspects disclosed herein. For example, as shown in the example of FIG. 7, first stream view GUI 702 may be implemented or rendered via an application (app executing on user computing device 311c1). For example, as shown in the example of FIG. 7, GUI 702 may be implemented or rendered via a native app executing on user computing device 311c1. In the example of FIG. 7, user computing device 311c1 is a user computer device as described for FIG. 3, e.g., where 311c1 is illustrated as an APPLE iPhone that implements the APPLE iOS operating system and that has display screen 700. User computing device 311c1 may execute one or more native applications (apps) on its operating system, including, for example, where first stream view GUI 702 is, or is part of, an application for generating declarative scripting modules and stream views as described for FIG. 6E herein. Such native apps may be implemented or coded (e.g., as computing instructions) in a computing language (e.g., SWIFT) executable by the user computing device operating system (e.g., APPLE iOS) by the processor of user computing device 311c1.

Additionally, or alternatively, first stream view GUI 702 may be implemented or rendered via a web interface, such as via a web browser application, e.g., Safari and/or Google Chrome app(s), or other such web browser or the like.

As shown in FIG. 7A, first stream view GUI 702 may be generated based on a declarative scripting module (e.g., declarative scripting module 640), where declarative scripting engine reads declarative scripting module 640 and generates the elements (stream variables, etc.) as shown on the GUI of FIG. 7A. FIG. 7A comprises a dynamically configurable GUI displayable on the display screen of a device (e.g., user computing device 311c1). In various aspects, declarative scripting engine or otherwise computer-executable instructions, when executed by one or more processors (e.g., processors 304), may cause the one or more processors to generate a dynamically configurable graphical user interface (GUI) that, when selected, programmatically updates the one or more data streams for analysis by the stream controller (e.g., stream controller 102). This can include programmatically updating code one or more declarative scripting modules generate dynamically configurable GUIs (i.e., stream view GUIs) comprising one or more selectable GUI elements. The GUI elements may each represent at least one of: (a) one or more input data stream variables (e.g., input data stream variables 212), (b) one or more snapshot stream variables (e.g., snapshot stream variables 214), (c) a listener entity (e.g., as described for FIG. 6C), or (d) an event (e.g., as described for FIG. 6C). In this way, first stream view GUI 702 is generated in in a bottom-up manner based on the language in the declarative scripting module 640. That is, from analysis of the descriptive language in the declarative scripting module, the declarative scripting engine may be used to generate first stream view GUI 702.

Figure 7B:
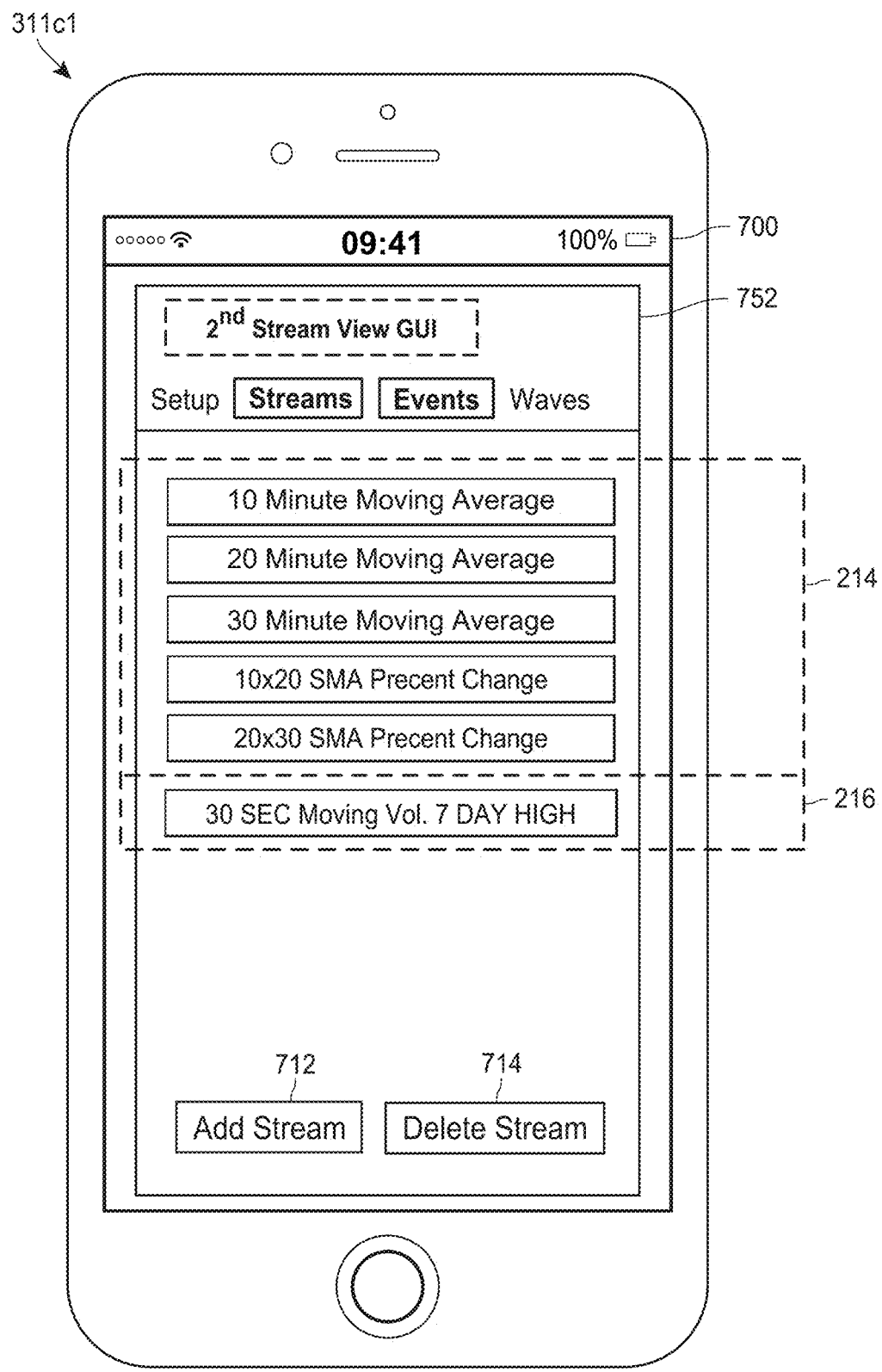
FIG. 7B illustrates an example second stream view graphic user interface (GUI), in accordance with various aspects disclosed herein.

Additionally, or alternatively, the code or otherwise configurations or script of declarative scripting modules may be modified, updated, or changed by a user (such as an unskilled user) via one or more stream view GUIs, for example, as described herein for FIGS. 7A and 7B. In such aspects, a stream view GUI may also be configured in a top-down manner where the user builds the declarative scripting module from the stream view GUI. That is, first stream view GUI 702 provides a stream configuration where users can add new variables and events to declarative scripting modules implemented and/or stored at servers 302.

First stream view GUI 702 may be used to generate, for example, stream model 202, where stream model 202 may be created, updated, modified, or otherwise configured, such as with the three sets of stream variables, including input data stream variables 212 and snapshot stream variables 214. The user may add and delete these stream variables via add stream button 712 and delete stream button 714, which allows the user to programmatically add declarative language (code) to a respective declarative scripting module (e.g., as shown and described herein for FIGS. 6A-6E). First stream view GUI 702 illustrates programmatic, and graphical, configuration of one or more stream variables of a given stream model (e.g., stream model 202). As shown, first stream view GUI 702 is used to configure input data stream variables 212 and snapshot stream variables 214 comprising symbol 212$s$, last price 212$p$, volume 212$v$, last-price-minus-one-second 214$p$, 10-minute-moving-average 214$ma$10, and 20-minute-moving-average 214$ma$20. As described for FIG. 2, first stream view GUI 702 sends a request to configure or update the declarative scripting modules with the input data stream variables 212 and snapshot stream variables 214 in order to configure or update stream model 202 to ingest or receive respective input data stream 112 and snapshot data stream 213.

In this way, stream views provide a visual interface for building stream models. The stream views abstract a user from the underlying declarative language in a way that is intuitive. The stream views GUI allows simple views based on stream variables (e.g., input data stream variables 212 and snapshot stream variables 214) to be translated into the code (e.g., declarative language in the declarative scripting module) as executed and implemented by IoT computing system 300.

Still further, stream views may be used to configure a view (e.g., GUI) that provides output information (e.g., based on trigger events), such as output of dynamic market views to traders. This allows for higher data fidelity and trigger metrics than conventional trading platforms, where such conventional platforms may allow the creation of market scanners with static criteria like volume, price change, but where the stream views, as described herein, allow for more dynamic scanners for equities where the short term moving average rate of changes are trending upward or downward, combined with aggregated data like equities where the recent volume bars are much higher than any volume bars in the last 10 days of trading activity.

In addition, stream GUI 702 also allows a user to run data mining tests using stored data and, to, via stream controller 102, initiate and/or scale computing clusters (e.g., clustered compute environment 100 or otherwise servers 302) to distribute data mining workload(s) to produce result(s), such as data insights.

FIG. 7B illustrates an example second stream view graphic user interface (GUI) 750, in accordance with various aspects disclosed herein. Second stream view GUI 750 may be coded, and may operate, in the same or similar way as described for stream view GUI 700. Second stream view GUI 750 illustrates an aspect of the disclosure where multiple stream views may be used to configure a stream model (e.g., stream model 202). For example, second stream view GUI 750 may be used to generate, for example, stream model 202, where stream model 202 may be created, updated, modified, or otherwise configured with snapshot stream variables 214 and aggregated stream variables 216. Second stream view GUI 750 may be a configuration in addition to first stream view GUI 702. This allows for graphical updates to existing stream models where the update from second stream view GUI 750 programmatically adds to the same, or connected, declarative scripting module. That is, second stream view GUI 752 may be used to programmatically, and graphically, configure one or more stream variables of a given stream model (e.g., stream model 202). As shown, second stream view GUI 752 may be accessed to configure snapshot stream variables 214 comprising 10-minute-moving-average 214$ma$10, 20-minute-moving-average 214$ma$20, and 20×30-simple-moving-average-rate-of-change 214$roc$, as well as aggregated stream variables 216 comprising 30-second-moving-volume-seven-day-high 216$v$7$d$. As for first stream view GUI 702, add stream button 712 and delete stream button 714 may be used to update or otherwise configure second stream view GUI 750.

Thus, second stream view GUI 750 illustrates building of a new stream view that is derived from the first stream view (e.g., first stream view GUI 702). The second stream view GUI 750 allows a user to configure new data streams (e.g., snapshot data stream 213 and aggregated data stream 215) using data streams that have been previously configured in initial stream views (e.g., in first stream view GUI 702). Such configuration allows, for graphical, programmatic configurations to set up data mining and other features as described herein. This allows for a GUI based platform for connecting company data streams (tick data, airplane engine diagnostics, or whatever an admin may configure the stream controller 102 to ingest and/or compute) and to further configure output data connectors comprising related events and triggers, as described herein.

Figure 7C:
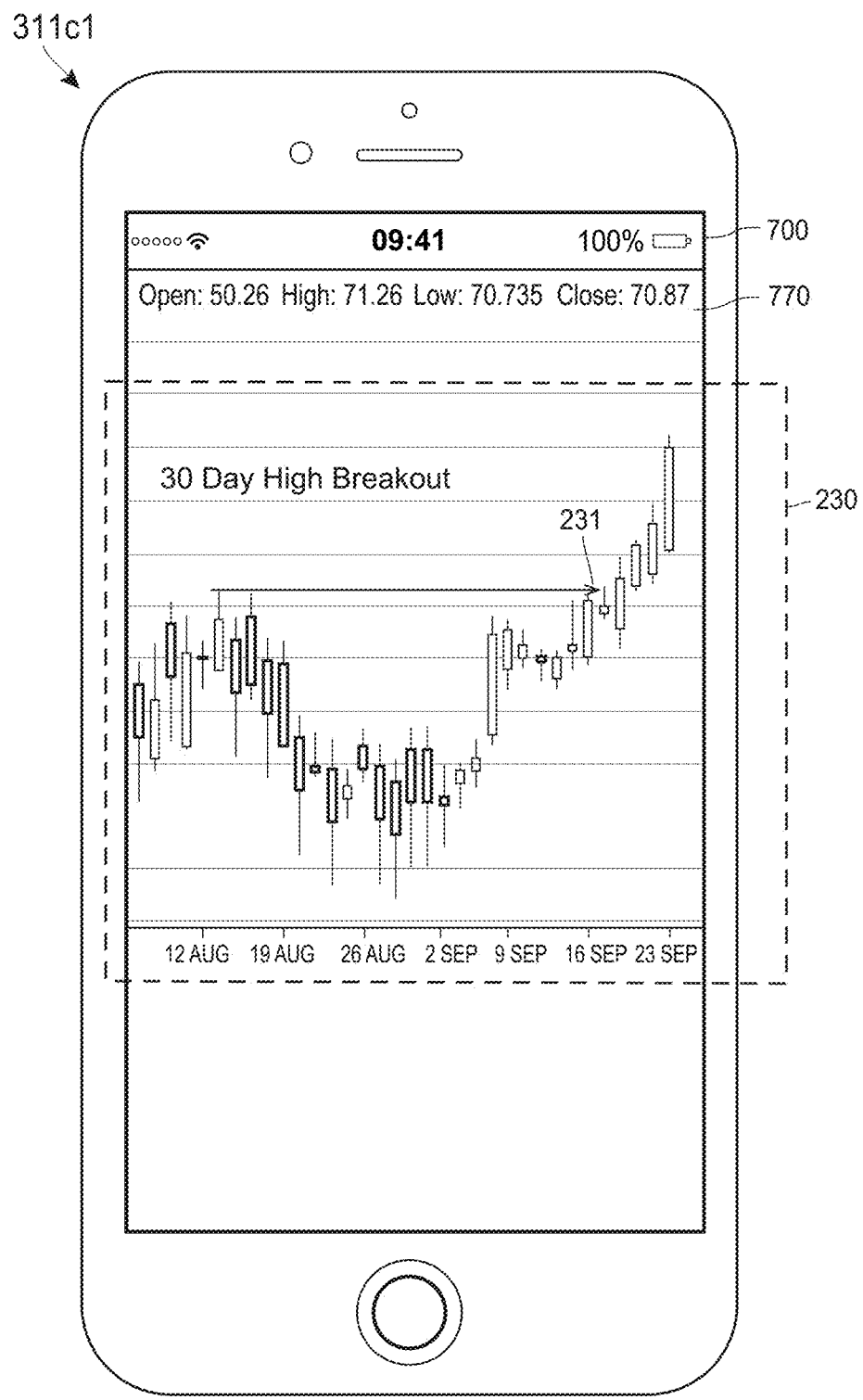
FIG. 7C illustrates an example graphic user interface (GUI) as implemented by a client application (app) configured to receive an output generated based on triggering of an event of a stream model, in accordance with various aspects disclosed herein.

FIG. 7C illustrates an example graphic user interface (GUI) 770 as implemented by a client application (app) configured to receive an output generated based on triggering of an event of a stream model, in accordance with various aspects disclosed herein. In the example of FIG. 7C, GUI 770 comprises a client application (app) (e.g., a native app implemented on an APPLE IPHONE computing device, e.g., user computing device 311$c$1, implementing the IOS operating system). The client app is configured to receive an output, e.g., as provided by IoT computing system 300, and generated based on triggering of the event (e.g., event 230) based on the input data stream (e.g., input data stream 112), the snapshot data stream (e.g., snapshot data stream 213), and/or the aggregated data stream 215 as ingested into, or computed for, the stream model (e.g., stream model 202).

In the example of FIG. 7C, the output comprises an indication of a 30 Day High Breakout 231 for a given security. The output could be a data message, as sent over computer network 320), and received by the client app of GUI 770. The message may be received by a RESTful API implemented on the client app, which causes the GUI 770 to indicate, graphically, that the event 230 for the 30 Day High Breakout 231 has been triggered. The event (e.g., event 230) may be configured via a declarative scripting module as described herein, for example, for FIG. 6C. That is, when stream data, as ingested or computed for a related stream model (e.g., stream model 202) triggers the event, the event fires and causes the GUI 770 to indicate the event. It is to be understood that event 230 may be indicated in various additional or different way, including by text, overlays, or other graphical indicators.

Figure 7D:
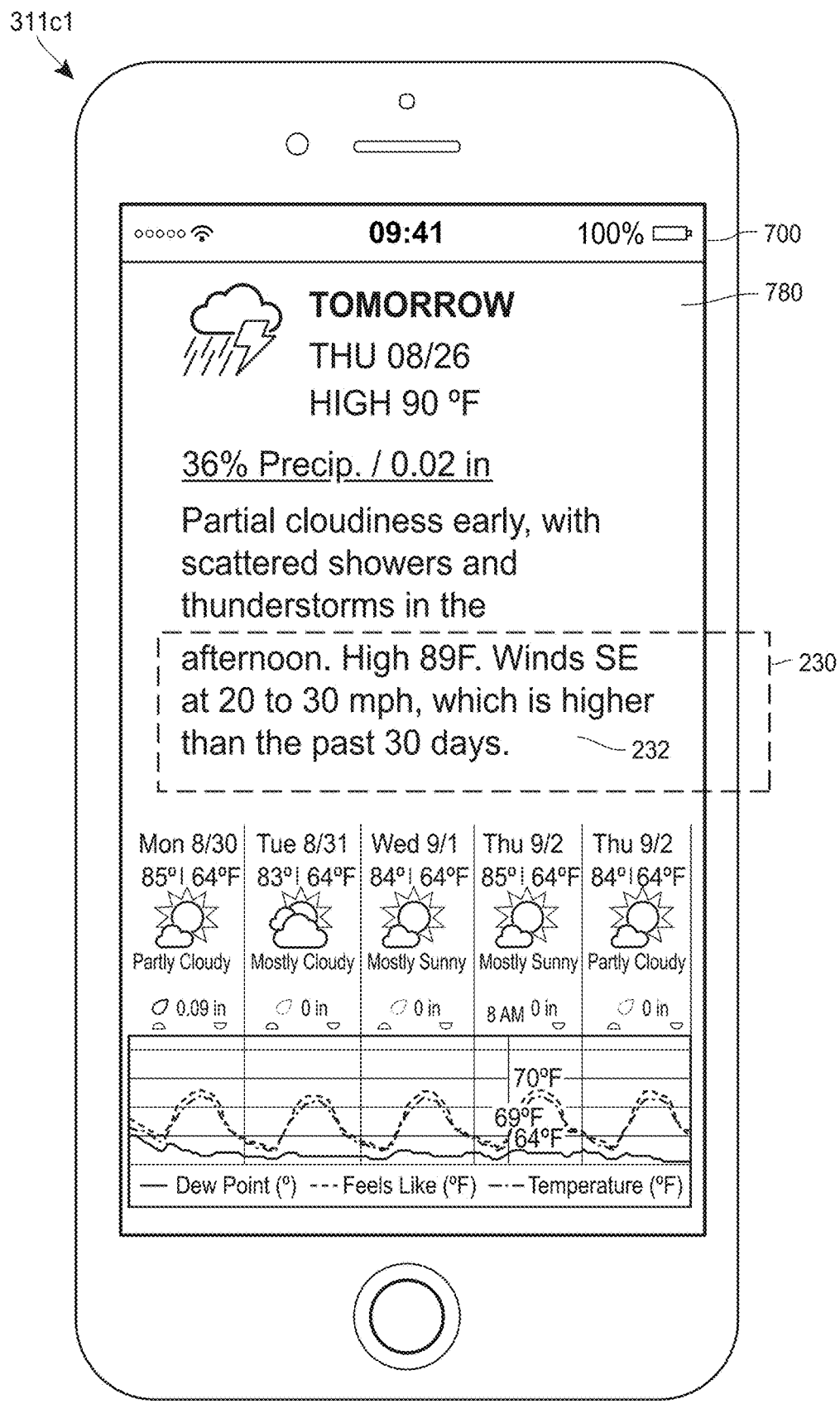
FIG. 7D illustrates a further example of a graphic user interface (GUI) as implemented by a client application (app)

FIG. 7D illustrates a further example of a graphic user interface (GUI) 780 as implemented by a client application (app) configured to receive an output generated based on triggering of an event of a stream model, in accordance with various aspects disclosed herein. In the example of FIG. 7D, GUI 780 comprises a client application (app) (e.g., a native app implemented on an APPLE IPHONE computing device, e.g., user computing device 311c1, implementing the IOS operating system). The client app is configured to receive an output, e.g., as provided by IoT computing system 300, and generated based on triggering of the event (e.g., event 230) based on input data stream (e.g., input data stream 112), the snapshot data stream (e.g., snapshot data stream 213), and/or the aggregated data stream 215 as ingested into, or computed for, a stream model (e.g., stream model 202).

In the example of FIG. 7D, the output comprises an indication of a High Winds 232 detected for a given 30-Day period. The output could be a data message, as sent over computer network 320), and received by the client app of GUI 780. The message may be received by a RESTful API implemented on the client app, which causes the GUI 780 to indicate, graphically, that the event 230 of High Winds 231 has been triggered. The event (e.g., event 230) may be configured via a declarative scripting module as described herein, for example, for FIG. 6E. That is, when stream data, as ingested or computed for a related stream model triggers the event 230, the event fires and causes the GUI 780 to indicate the event. It is to be understood that event 230 may be indicated in various additional or different way, including by text, overlays, or other graphical indicators. Other weather data may also be indicated, predicted (e.g., by machine learning model as described herein), and displayed, such as temperature, dew point, etc. as illustrated for FIG. 7D.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An adaptable internet-of-things (IoT) computing system configured for improved declarative control of streaming data, the IoT computing system comprising:
a stream controller communicatively connected to a computer network;
a declarative scripting engine comprising one or more declarative scripting modules comprising a declarative language modifiable to programmatically configure one or more data streams ingested by the stream controller; and
computer-executable instructions stored in one or more memories and configured for execution by one or more processors, that, upon execution by the one or more processors, cause the one or more processors to:
determine, by the declarative scripting engine, an input data stream based on a first declarative statement defining one or more input data stream variables of the declarative scripting language in the one or more declarative scripting modules;
bind the input data stream to the stream controller, wherein the input data stream data is ingested into the one or more memories;
generate, by the declarative scripting engine, a snapshot data stream based on a second declarative statement defining one or more snapshot stream variables of the declarative scripting language in the one or more declarative scripting modules,
wherein the snapshot data stream is derived from the input data stream and ingested into the one or more memories, and
wherein the one or more snapshot stream variables are computed based on the one or more one or more input data stream variables, and
define a stream model scaled or configured by the declarative scripting engine analyzing at least the first declarative statement and the second declarative statement to configure a streaming relationship between the input data stream and snapshot stream data;
determine a listener entity comprising an event based on a listener declarative statement of the declarative scripting language; and
trigger the event based on the input data stream or the snapshot data stream as ingested into the stream model.

2. The adaptable IoT computing system of claim 1, wherein the computer-executable instructions further comprise instructions, that when executed by the one or more processors, cause the one or more processors to:
generate an aggregated data stream based on a third declarative statement defining one or more aggregated stream variables of the declarative scripting language in the one or more declarative scripting modules,
wherein the aggregated data stream is derived from at least one of: the input data stream data or the snapshot data stream, and
wherein the stream model further comprises the aggregated data stream.

3. The adaptable IoT computing system of claim 1, wherein the stream model comprises a session of data, including the input data stream and the snapshot data stream, at a session time interval.

4. The adaptable IoT computing system of claim 1, wherein the computer-executable instructions further comprise instructions, that when executed by the one or more processors, cause the one or more processors to:
generate a dynamically configurable graphical user interface (GUI) that, when selected, programmatically updates the one or more data streams for analysis by the stream controller, the dynamically configurable GUI comprising one or more selectable GUI elements each representing at least one of: (a) the one or more input data stream variables, (b) the one or more snapshot stream variables, (c) the listener entity, or (d) the event.

5. The adaptable IoT computing system of claim 1, further comprising a client application (app) configured to receive an output generated based on triggering of the event based on the input data stream or the snapshot data stream as ingested into the stream model.

6. The adaptable IoT computing system of claim 1, wherein the computer-executable instructions further comprise instructions, that when executed by the one or more processors, cause the one or more processors to:
automatically generate an instance of an entity class corresponding to the listener entity.

7. The adaptable IoT computing system of claim 1, wherein the computer-executable instructions further comprise instructions, that when executed by the one or more processors, cause the one or more processors to:
scale a compute cluster size corresponding to the stream controller based on at least one of: a number of messages included in the input data stream, the first declarative statement, the second declarative statement, or the listener declarative statement.

8. The adaptable IoT computing system of claim 7, wherein the computer-executable instructions further comprise instructions, that when executed by the one or more processors, cause the one or more processors to:
scale the cluster size down to reduce at least one of: (i) processor resources, or (ii) memory resources.

9. The adaptable IoT computing system of claim 7, wherein the computer-executable instructions further comprise instructions, that when executed by the one or more processors, cause the one or more processors to:
reallocate one or more nodes executing in the compute cluster.

10. The adaptable IoT computing system of claim 7, wherein the computer-executable instructions further comprise instructions, that when executed by the one or more processors, cause the one or more processors to:
suspend one or more nodes of the compute cluster based on data pipe size in the compute cluster.

11. The adaptable IoT computing system of claim 1, wherein the declarative language is configurable to modify the declarative scripting engine to implement one or more of:
injecting one or more respective dependencies of one or more stored variables and one or more stored entity events;
determining a range of dates that can be used to perform back tests by analyzing the one or more respective dependencies; or
performing one or more data mining operations on stored data falling within the range of dates.

12. The adaptable IoT computing system of claim 1, wherein the computer-executable instructions further comprise instructions, that when executed by the one or more processors, cause the one or more processors to:

instantiate an instance of an entity class corresponding to the listener entity, the entity class comprising a code annotation including an event type descriptor and associated with a callback function,
wherein the code annotation causes the one or more processor to invoke the callback function in response to receiving an event matching the type of the event type descriptor.

13. The adaptable IoT computing system of claim 1, wherein the input data stream is converted into a common information model format for ingestion by the stream controller.

14. The adaptable IoT computing system of claim 1, wherein the input data stream comprises time-series data.

15. The adaptable IoT computing system of claim 1, wherein the input data stream comprises at least one of: market data or weather data.

16. The adaptable IoT computing system of claim 1 further comprising a machine learning model trained on training data comprising the one or more data streams and event data of the event as triggered based on the one or more data streams, the machine learning model configured to predict or classify one or more pattern event triggers based on one or more combinations of the one or more data streams and the event.

17. An adaptable internet-of-things (IoT) computing method for improved declarative control of streaming data, the adaptable IoT computing method:
determining, by a declarative scripting engine, an input data stream based on a first declarative statement defining one or more input data stream variables of a declarative scripting language in one or more declarative scripting modules;
binding the input data stream to the stream controller, wherein the input data stream data is ingested into one or more memories;
generating, by the declarative scripting engine, a snapshot data stream based on a second declarative statement defining one or more snapshot stream variables of the declarative scripting language in the one or more declarative scripting modules,
wherein the snapshot data stream is derived from the input data stream and ingested into the one or more memories, and
wherein the one or more snapshot stream variables are computed based on the one or more one or more input data stream variables, and
defining a stream model scaled or configured by the declarative scripting engine analyzing at least the first declarative statement and the second declarative statement to configure a streaming relationship between the input data stream and snapshot stream data;
determining a listener entity comprising an event based on a listener declarative statement of the declarative scripting language; and
triggering the event based on the input data stream or the snapshot data stream as ingested into the stream model.

18. The adaptable IoT computing method of claim 17 further comprising:
generating an aggregated data stream based on a third declarative statement defining one or more aggregated stream variables of the declarative scripting language in the one or more declarative scripting modules,
wherein the aggregated data stream is derived from at least one of: the input data stream data or the snapshot data stream, and
wherein the stream model further comprises the aggregated data stream.

19. The adaptable IoT computing method of claim 17, wherein the stream model comprises a session of data, including the input data stream and the snapshot data stream, at a session time interval.

20. The adaptable IoT computing method of claim 17 further comprising:
generating a dynamically configurable graphical user interface (GUI) that, when selected, programmatically updates the one or more data streams for analysis by the stream controller, the dynamically configurable GUI comprising one or more selectable GUI elements each representing at least one of: (a) the one or more input data stream variables, (b) the one or more snapshot stream variables, (c) the listener entity, or (d) the event.

21. The adaptable IoT computing method of claim 17 further comprising:
receiving, at a client application (app), an output generated based on triggering of the event based on the input data stream or the snapshot data stream as ingested into the stream model.

22. The adaptable IoT computing method of claim 17 further comprising:
automatically generating an instance of an entity class corresponding to the listener entity.

23. The adaptable IoT computing method of claim 17 further comprising:
scaling a compute cluster size corresponding to the stream controller based on at least one of: a number of messages included in the input data stream, the first declarative statement, the second declarative statement, or the listener declarative statement.

24. The adaptable IoT computing method of claim 23 further comprising:
scaling the cluster size down to reduce at least one of: (i) processor resources, or (ii) memory resources.

25. The adaptable IoT computing method of claim 23 further comprising:
reallocating one or more nodes executing in the compute cluster.

26. The adaptable IoT computing method of claim 23 further comprising:
suspending one or more nodes of the compute cluster based on data pipe size in the compute cluster.

27. The adaptable IoT computing method of claim 17 further comprising:
injecting one or more respective dependencies of one or more stored variables and one or more stored entity events;
determining a range of dates that can be used to perform back tests by analyzing the one or more respective dependencies; or
performing one or more data mining operations on stored data falling within the range of dates.

28. The adaptable IoT computing method of claim 17 further comprising:
instantiating an instance of an entity class corresponding to the listener entity, the entity class comprising a code annotation including an event type descriptor and associated with a callback function; and
invoking, based on the code annotation, the callback function in response to receiving an event matching the type of the event type descriptor.

29. The adaptable IoT computing method of claim 17 further comprising predicting or classifying, by a machine learning model trained on training data comprising the one or more data streams and event data of the event as triggered based on the one or more data streams, one or more pattern event triggers based on one or more combinations of the one or more data streams and the event.

30. A tangible, non-transitory computer-readable medium storing instructions for improved declarative control of streaming data, that when executed by one or more processors cause the one or more processors to:
- determine, by a declarative scripting engine, an input data stream based on a first declarative statement defining one or more input data stream variables of a declarative scripting language in one or more declarative scripting modules;
- bind the input data stream to the stream controller, wherein the input data stream data is ingested into one or more memories;
- generate, by the declarative scripting engine, a snapshot data stream based on a second declarative statement defining one or more snapshot stream variables of the declarative scripting language in the one or more declarative scripting modules,
  - wherein the snapshot data stream is derived from the input data stream and ingested into the one or more memories, and
  - wherein the one or more snapshot stream variables are computed based on the one or more one or more input data stream variables, and
- define a stream model scaled or configured by the declarative scripting engine analyzing at least the first declarative statement and the second declarative statement to configure a streaming relationship between the input data stream and snapshot stream data;
- determine a listener entity comprising an event based on a listener declarative statement of the declarative scripting language; and
- trigger the event based on the input data stream or the snapshot data stream as ingested into the stream model.

* * * * *